(12) United States Patent
Tamura et al.

(10) Patent No.: US 7,684,591 B2
(45) Date of Patent: Mar. 23, 2010

(54) INFORMATION PROCESSING SYSTEM, INFORMATION PROCESSING APPARATUS AND INFORMATION PROCESSING METHOD, PROGRAM, AND RECORDING MEDIUM

(75) Inventors: Asako Tamura, Kanagawa (JP); Hideo Miyamaki, Tokyo (JP); Masaharu Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1077 days.

(21) Appl. No.: 11/350,828

(22) Filed: Feb. 10, 2006

(65) Prior Publication Data

US 2006/0192856 A1 Aug. 31, 2006

(30) Foreign Application Priority Data

Feb. 28, 2005 (JP) ............................. 2005-054393

(51) Int. Cl.
*G06K 9/00* (2006.01)
*H04N 5/225* (2006.01)
(52) U.S. Cl. ...................................... 382/103; 348/169
(58) Field of Classification Search ................ 382/103, 382/107, 149, 236, 287; 348/47–50, 73, 348/94, 137, 152, 154, 155, 169–172, 208.1, 348/208.14, 208.16, 267, 347, 352, 353, 348/558, 148, 208.2; 712/231, 300
See application file for complete search history.

(56) References Cited

U.S. PATENT DOCUMENTS 6,125,145 A * 9/2000 Koyanagi et al. ...... 375/240.16
6,753,902 B1 * 6/2004 Kashiwazaki ............... 348/119

FOREIGN PATENT DOCUMENTS

| JP | 11-069342 | 3/1999 |
| JP | 2001-319279 | 11/2001 |
| JP | 2002-101408 | 4/2002 |

* cited by examiner

*Primary Examiner*—Abolfazl Tabatabai
(74) *Attorney, Agent, or Firm*—Oblon, Spivak, McClelland, Maier & Neustadt, L.L.P.

(57) ABSTRACT

A information processing apparatus and method is disclosed wherein an image of a predetermined region can be picked up and a desired moving body in the predetermined region can be tracked readily to pick up an image of the moving body. A sensor image acquisition module acquires a sensor image. A moving body detection module detects moving bodies existing in a predetermined region based on the sensor image. A tracking object designation module designates one of the detected moving bodies. When a moving body is designated by the tracking object designation module, an image pickup mode changeover module sets the image pickup mode to a continuous tracking mode in which the designated moving body is tracked to pick up an image of the moving body. The invention can be applied, for example, to a monitoring system.

8 Claims, 15 Drawing Sheets

FIG. 11

| | CYCLIC IMAGE PICKUP MODE | CONTINUOUS TRACKING MODE |
|---|---|---|
| IMAGE PICKUP OBJECT OF ZOOM CAMERA 122 | ALL OF DETECTED MOVING BODIES | SINGLE DESIGNATED MOVING BODY |
| OPPORTUNITY OF STARTING OF MODE | ·START OF IMAGE PICKUP<br>·DISAPPEARANCE OF MOVING BODY TRACKED CONTINUOUSLY | ·CLICK MOVING BODY FRAMEWORK ON SENSOR IMAGE 151 |
| DISPLAY OF OPERATION BUTTON | CYCLIC IMAGE PICKUP BUTTON 261: EMPHATICALLY DISPLAYED<br>CONTINUOUS TRACKING BUTTON 262: NOT DISPLAYED | CYCLIC IMAGE PICKUP BUTTON 261: NORMALLY DISPLAYED<br>CONTINUOUS TRACKING BUTTON 262: EMPHATICALLY DISPLAYED<br>OR<br>CYCLIC IMAGE PICKUP BUTTON 261: NOT DISPLAYED<br>CONTINUOUS TRACKING BUTTON 262: EMPHATICALLY DISPLAYED |
| OPPORTUNITY OF ENDING OF MODE | ·CLICK MOVING BODY FRAMEWORK ON SENSOR IMAGE 151 | ·DISAPPEARANCE OF MOVING BODY CONTINUOUSLY TRACKED<br>·CLICK OF CYCLIC IMAGE PICKUP BUTTON 261 |

INFORMATION PROCESSING SYSTEM, INFORMATION PROCESSING APPARATUS AND INFORMATION PROCESSING METHOD, PROGRAM, AND RECORDING MEDIUM

CROSS REFERENCES TO RELATED APPLICATIONS

The present invention contains subject matter related to Japanese Patent Application JP 2005-054393 filed in the Japanese Patent Office on Feb. 28, 2005, the entire contents of which being incorporated herein by reference.

BACKGROUND OF THE INVENTION

This invention relates to an information processing system, an information processing apparatus and an information processing method, a program, and a recording medium, and more particularly to an information processing system, an information processing apparatus and an information processing method, a program and a recording medium wherein an image of a predetermined region can be picked up and a moving body in the predetermined region desired by a user can be tracked to pick up an image of the moving body.

In recent years, in order to assure the security, a multi-point camera monitoring system (multi camera system) is frequently installed, for example, in a bank, a parking area, a house and so forth in which an automatic teller machine (ATM) is placed.

Such a multi camera system as described above includes a plurality of video cameras and a recording apparatus for recording images acquired by the video cameras. An apparatus for use with such a multi camera system as described above has been proposed wherein a plurality of images are reduced in scale and combined into a one-frame image as disclosed for example, in Japanese Patent Laid-open No. Hei 10-108163 (hereinafter referred to as Patent Document 1). Also a device has been proposed wherein images from a plurality of video cameras are collected and recorded on a recording medium such as a video tape as disclosed, for example, in Japanese Patent Laid-open No. 2000-243062 (hereinafter referred to as Patent Document 2).

FIG. 1 shows an appearance of an example of a conventional multi camera system.

Referring to FIG. 1, the multi camera system 1 shown includes four cameras 11-1 to 11-4. The cameras 11-1 to 11-4 are stationary cameras whose photographing direction is fixed or pan tilt zoom cameras whose photographing direction is variable. The cameras 11-1 to 11-4 monitor a region 21 of a circular wide area of a diameter of 40 m, for example, in a parking area.

FIG. 2 shows an example of a configuration of the multi camera system shown in FIG. 1.

Referring to FIG. 2, each of the cameras 11-1 to 11-4 picks up an image. The cameras 11-1 to 11-4 are individually connected to a recording apparatus 41 and supply analog signals of images obtained by image pickup to the recording apparatus 41. The recording apparatus 41 records image data which are digital signals of images obtained by A/D conversion of the analog signals of the images supplied from the cameras 11-1 to 11-4. Further, the recording apparatus 41 is connected to a display apparatus 42 and causes the display apparatus 42 to display an image corresponding to the image data.

However, in the multi camera system 1 in FIG. 2, the cameras which can be connected to the recording apparatus 41 are limited to only four cameras 11-1 to 11-4, and therefore, the extensibility of the multi camera system 1 is poor.

FIG. 3 shows another example of the configuration of the multi camera system 1 in FIG. 1.

Referring to FIG. 3, the cameras 11-1 to 11-4 are connected to a personal computer (PC) 52 through a network 51. Each of the cameras 11-1 to 11-4 picks up an image and transmit image data obtained by the image pickup to the PC 52 through the network 51 in accordance with the IP (Internet Protocol). The PC 52 records the image data and displays an image corresponding to the image data.

As described above, in the multi camera system 1, four cameras 11-1 to 11-4 are required to monitor the region 21. Therefore, it is cumbersome to install the cameras, and a high cost is required for the multi camera system 1. Further, in order to acquire high definition images, it is necessary to pick up images with a raised image pickup magnification, and therefore, a greater number of cameras are required. However, where the number of cameras is not increased while it is intended to acquire high definition images, it is difficult to acquire high definition images from all portions of the entire region 21. Therefore, it is necessary for the operator to normally monitor normal images and designate a desired region to acquire a high definition image of the region.

A monitoring camera is available which can monitor a situation within a wide area using a single camera by picking up an image of a subject while the image pickup direction is shifted successively to obtain a panorama image of the entire subject formed from a plurality of unit images.

SUMMARY OF THE INVENTION

However, with such a monitoring camera as just described, in order to produce a single image of an entire subject, it is necessary to acquire all of unit images which form the image of the entire subject, and much time is required to produce the image of the entire subject. Accordingly, it is difficult to completely catch any slight variation in situation which appears in a short period of time within a range of image pickup.

In particular, a moving body (moving subject) which moves at a high speed sometimes moves out of the range of image pickup in a period of time after an image of the entire image pickup range is acquired until a next image of the entire image pickup range is acquired. Also a user sometimes wants to track and pick up an image of a desired moving body as occasion demands.

It is desirable for the present invention to provide an information processing system, an information processing apparatus and an information processing method, a program, and a recording medium wherein an image of a predetermined region can be picked up and a desired moving body in the predetermined region can be tracked readily to pick up an image of the moving body.

In order to attain the desire described above, according to an embodiment of the present invention, there is provided an information processing system including region image pickup means for picking up an image of a predetermined region, detection means for detecting moving bodies existing in the predetermined region based on a region image obtained by the image pickup by the region image pickup means, designation means for designating one of the moving bodies detected by the detection means, and setting means for setting an image pickup mode to a cyclic image pickup mode in which images of the moving bodies detected by the detection means are successively picked up or a continuous tracking mode in which the moving body designated by the designation means is tracked to pick up an image of the moving body, wherein the setting means setting the image pickup mode to the continuous tracking mode when one of the moving bodies is designated by the designation means.

According to another embodiment of the present invention, there is provided an information processing apparatus for controlling image pickup of a subject, including region image pickup control means for controlling region image pickup means which picks up an image of a predetermined region, to pick up an image of the predetermined region, detection means for detecting moving bodies existing in the predetermined region based on a region image obtained by the image pickup by the region image pickup means, moving body image pickup control means for controlling moving body image pickup means which picks up images of the moving bodies detected by the detection means, to pick up images of the moving bodies, designation means for designating one of the moving bodies detected by the detection means, and setting means for setting an image pickup mode to a cyclic image pickup mode in which images of the moving bodies detected by the detection means are successively picked up or a continuous tracking mode in which the moving body designated by the designation means is tracked to pick up an image of the moving body, wherein the setting means setting the image pickup mode to the continuous tracking mode when one of the moving bodies is designated by the designation means.

The information processing apparatus may be configured such that the detection means detects also disappearance of any moving body detected already, and the setting means sets the image pickup mode to the cyclic image pickup mode when disappearance of the moving body designated by the designation means is detected by the detection means.

According to a further embodiment of the present invention, there is provided an information processing method for an information processing apparatus for controlling image pickup of a subject, including the steps of: controlling region image pickup means which picks up an image of a predetermined region, to pick up an image of the predetermined region; detecting moving bodies existing in the predetermined region based on a region image obtained by the image pickup by the region image pickup means; controlling moving body image pickup means which picks up images of the moving bodies detected by the process at the detecting step, to pick up images of the moving bodies; designating one of the moving bodies detected by the process at the detecting step; and setting an image pickup mode to a cyclic image pickup mode in which images of the moving bodies detected by the process at the detecting step are successively picked up or a continuous tracking mode in which the moving body designated by the process at the designating step is tracked to pick up an image of the moving body; wherein the process at the setting step setting the image pickup mode to the continuous tracking mode when one of the moving bodies is designated by the process at the designating step.

According to a still further embodiment of the present invention, there is provided a program for causing a computer to execute a process of controlling image pickup of a subject, including the steps of: controlling region image pickup means which picks up an image of a predetermined region, to pick up an image of the predetermined region; detecting moving bodies existing in the predetermined region based on a region image obtained by the image pickup by the region image pickup means; controlling a moving body image pickup means which picks up images of the moving bodies detected by the process at the detecting step, to pick up images of the moving bodies; designating one of the moving bodies detected by the process at the detecting step; and setting an image pickup mode to a cyclic image pickup mode in which images of the moving bodies detected by the process at the detecting step are successively picked up or a continuous tracking mode in which the moving body designated by the process at the designating step is tracked to pick up an image of the moving body; wherein the process at the setting step setting the image pickup mode to the continuous tracking mode when one of the moving bodies is designated by the process at the designating step.

According to a still further embodiment of the present invention, there is provided a recording medium on or in which a program for causing a computer to execute a process of controlling image pickup of a subject is recorded, the program including the steps of: controlling region image pickup means which picks up an image of a predetermined region, to pick up an image of the predetermined region; detecting moving bodies existing in the predetermined region based on a region image obtained by the image pickup by the region image pickup means; controlling moving body image pickup means which picks up images of the moving bodies detected by the process at the detecting step, to pick up images of the moving bodies detected by the process at the detecting step; designating one of the moving bodies detected by the process at the detecting step; and setting an image pickup mode to a cyclic image pickup mode in which images of the moving bodies detected by the process at the detecting step are successively picked up or a continuous tracking mode in which the moving body designated by the process at the designating step is tracked to pick up an image of the moving body; wherein the process at the setting step setting the image pickup mode to the continuous tracking mode when one of the moving bodies is designated by the process at the designating step.

In the information processing system, information processing apparatus, information processing method, program and recording medium, an image of a predetermined region is picked up, and moving bodies existing in the predetermined region are detected based on a region image obtained by the image pickup. Then, images of the detected moving bodies are picked up. Then, if one of the detected moving bodies is designated, then the image pickup mode is set to the continuous tracking mode from between the cyclic image pickup mode in which images of the moving bodies detected by the detection means or at the detecting step are successively picked up and the continuous tracking mode in which the moving body designated by the designation means or at the designating step is tracked to pick up an image of the moving body.

With the information processing system, information processing apparatus, information processing method, program and recording medium, an image of a predetermined region can be picked up and a moving body in the predetermined region desired by the user can be tracked readily to pick up an image of the moving body.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a view illustrating details of a cyclic image pickup mode and a continuous tracking mode used in the monitoring system of FIG. 4;

DETAILED DESCRIPTION OF THE PREFERRED EMBODIMENT

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiment of the present invention is all described in the claims. In other words, the following description does not deny the presence of an invention which corresponds to a particular element described in the description of the embodiment of the present invention but is not recited in the claims, that is, the description does not deny the presence of an invention which may be filed for patent in a divisional patent application or may be additionally included into the present patent application as a result of later amendment to the claims.

Figure 12:
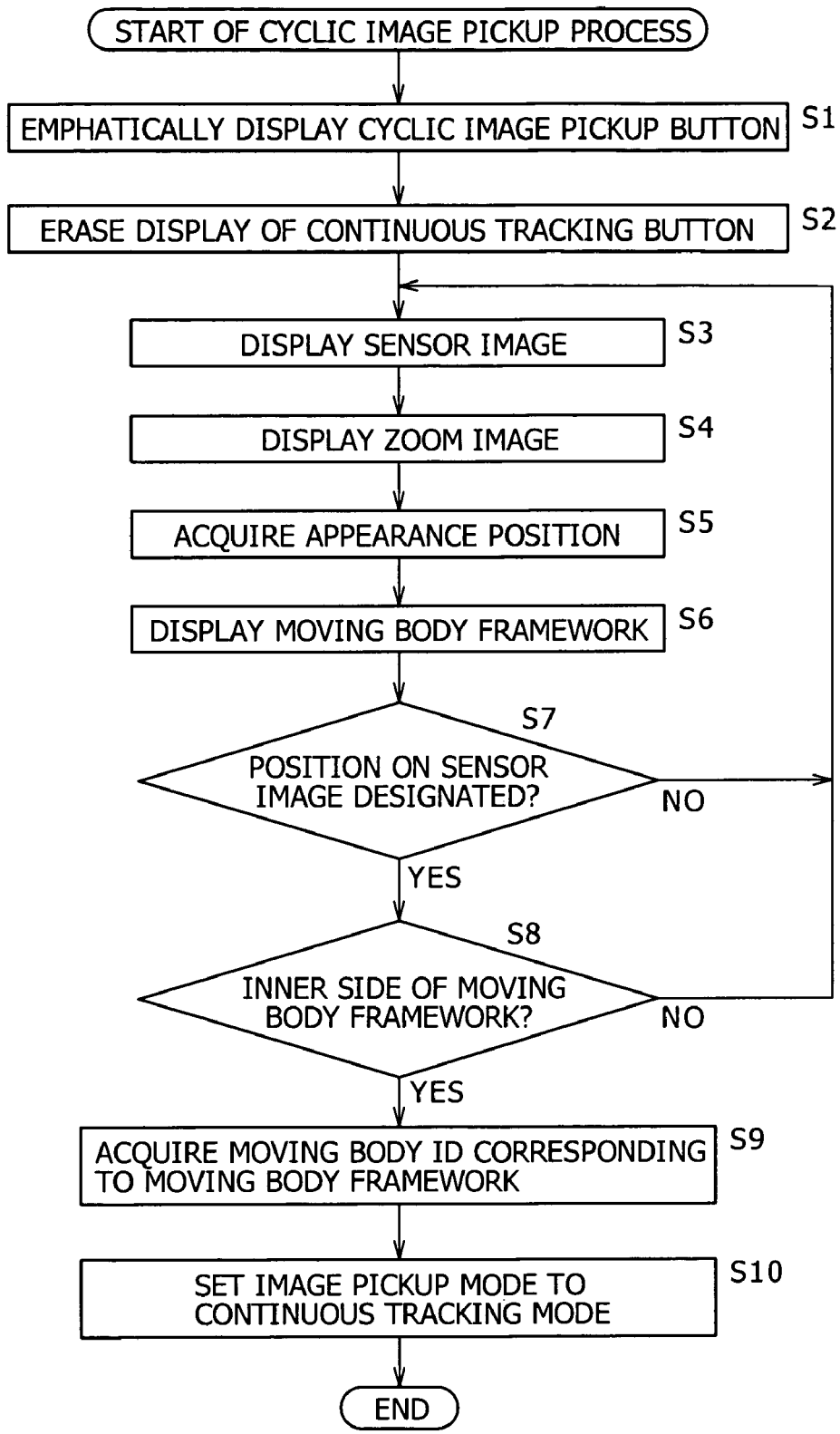
FIG. 12 is a flow chart illustrating a cyclic image pickup process executed by the client shown in FIG. 5 when the image pickup mode is the cyclic image pickup mode.

An information processing system according to claim 1 includes a region image pickup section (for example, a sensor camera 121 of FIG. 5) for picking up an image of a predetermined region, a detection section (for example, a moving body detection module 222 of FIG. 7) for detecting moving bodies existing in the predetermined region based on a region image obtained by the image pickup by the region image pickup section, a designation section (for example, a tracking object designation module 227 of FIG. 7) for designating one of the moving bodies detected by the detection section, and a setting section (for example, an image pickup mode changeover module 228 of FIG. 7) for setting an image pickup mode to a cyclic image pickup mode in which images of the moving bodies detected by the detection section are successively picked up or a continuous tracking mode in which the moving body designated by the designation section is tracked to pick up an image of the moving body, the setting section setting the image pickup mode to the continuous tracking mode when one of the moving bodies is designated by the designation section (for example, a process at step S10 of FIG. 12).

Figure 7:
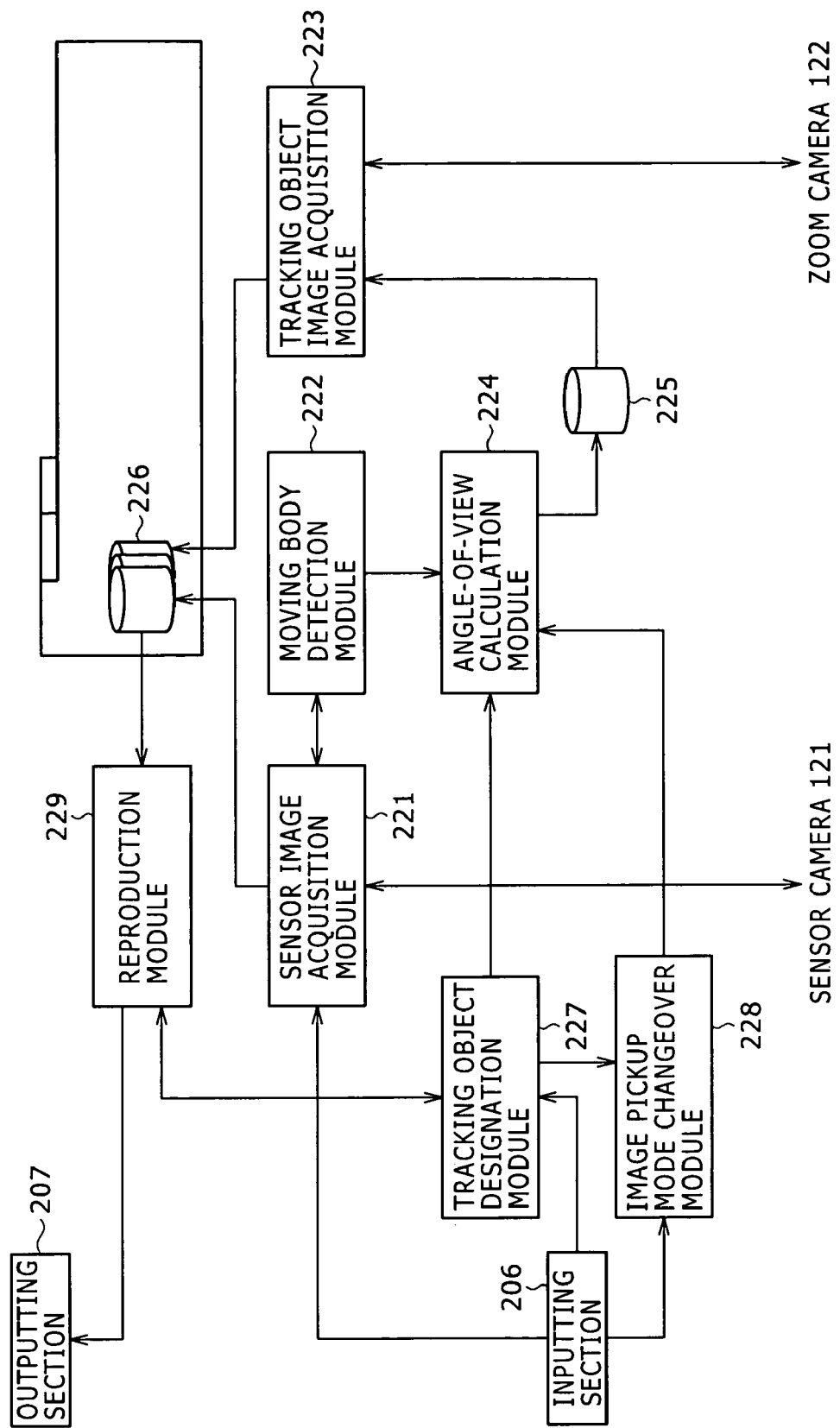
FIG. 7 is a block diagram showing an example of a functional configuration of the client shown in FIG. 5.

An information processing apparatus according to claim 2 is an information processing apparatus (for example, a client 132 of FIG. 5) for controlling image pickup of a subject and includes a region image pickup control section (for example, a sensor image acquisition module 221 of FIG. 7) for controlling a region image pickup section (for example, a sensor camera 121 of FIG. 5), which picks up an image of a predetermined region, to pick up an image of the predetermined region, a detection section (for example, a moving body detection module 222 of FIG. 7) for detecting moving bodies existing in the predetermined region based on a region image obtained by the image pickup by the region image pickup section, a moving body image pickup control section (for example, a tracking object image acquisition module 223 of FIG. 7) for controlling a moving body image pickup section (for example, a zoom camera 122 of FIG. 5), which picks up images of the moving bodies detected by the detection section, to pick up images of the moving bodies, a designation section (for example, a tracking object designation module 227 of FIG. 7) for designating one of the moving bodies detected by the detection section, and a setting section (for example, an image pickup mode changeover module 228 of FIG. 7) for setting an image pickup mode to a cyclic image pickup mode in which images of the moving bodies detected by the detection section are successively picked up or a continuous tracking mode in which the moving body designated by the designation section is tracked to pick up an image of the moving body, the setting section setting the image pickup mode to the continuous tracking mode when one of the moving bodies is designated by the designation section (for example, a process at step S10 of FIG. 12).

Figure 13:
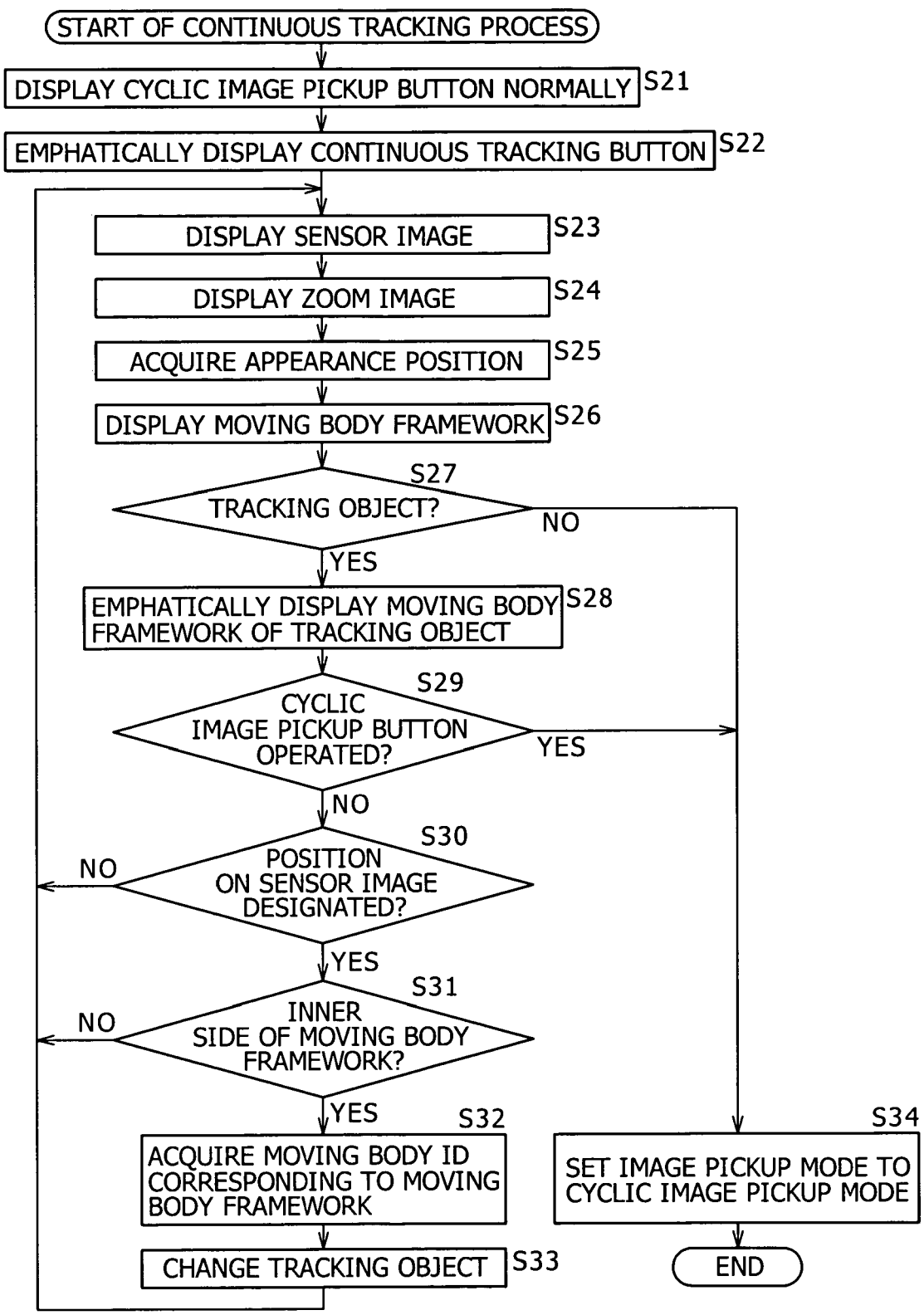
FIG. 13 is a flow chart illustrating a continuous tracking process executed by the client shown in FIG. 5 when the image pickup mode is the continuous tracking mode.

The information processing apparatus according to claim 1 is configured such that the detection section detects also disappearance of any moving body detected already (for example, a process at step S52 of FIG. 14), and the setting section sets the image pickup mode to the cyclic image pickup mode when disappearance of the moving body designated by the designation section is detected by the detection section (for example, a process at step S34 of FIG. 13).

An information processing method according to claim 4 is an information processing method for an information processing apparatus (for example, a client 132 of FIG. 5) for controlling image pickup of a subject and includes a region image pickup control step (for example, a step S51 of FIG. 14) of controlling a region image pickup section (for example, a sensor camera 121 of FIG. 5), which picks up an image of a predetermined region, to pick up an image of the predetermined region, a detection step (for example, a step S52 of FIG. 14) of detecting moving bodies existing in the predetermined region based on a region image obtained by the image pickup by the region image pickup section, a moving body image pickup control step (for example, a step S60 of FIG. 14) of controlling a moving body image pickup section (for example, a zoom camera 122 of FIG. 5), which picks up images of the moving bodies detected by the process at the detection step, to pick up images of the moving bodies, a designation step (for example, a process at step S9 of FIG. 12) of designating one of the moving bodies detected by the process at the detection step, and a setting step (for example, a process at step S10 of FIG. 12) of setting an image pickup mode to a cyclic image pickup mode in which images of the moving bodies detected by the process at the detection step are successively picked up or a continuous tracking mode in which the moving body designated by the process at the designation step is tracked to pick up an image of the moving body, the process at the setting step setting the image pickup mode to the continuous tracking mode when one of the moving bodies is designated by the process at the designation step.

A program according to claim 5 and a program recorded in or on a recording medium according to claim 5 are a program for causing a computer to execute a process of controlling image pickup of a subject and include a region image pickup control step (for example, a step S51 of FIG. 14) of controlling a region image pickup section (for example, a sensor camera 121 of FIG. 5), which picks up an image of a predetermined region, to pick up an image of the predetermined region, a detection step (for example, a step S52 of FIG. 14) of detecting moving bodies existing in the predetermined region based on a region image obtained by the image pickup by the region image pickup section, a moving body image pickup control step (for example, a step S60 of FIG. 14) of controlling a moving body image pickup section (for example, a zoom camera 122 of FIG. 5), which picks up images of the moving bodies detected by the process at the detection step, to pick up images of the moving bodies, a designation step (for example, a process at step S9 of FIG. 12) of designating one of the moving bodies detected by the process at the detection step, and a setting step (for example, a process at step S10 of FIG. 12) of setting an image pickup mode to a cyclic image pickup mode in which images of the moving bodies detected by the process at the detection step are successively picked up or a continuous tracking mode in which the moving body designated by the process at the designation step is tracked to pick up an image of the moving body, the process at the setting step setting the image pickup mode to the continuous tracking mode when one of the moving bodies is designated by the process at the designation step.

In the following, a particular embodiment of the present invention is described in detail with reference to the accompanying drawings.

Figure 4:
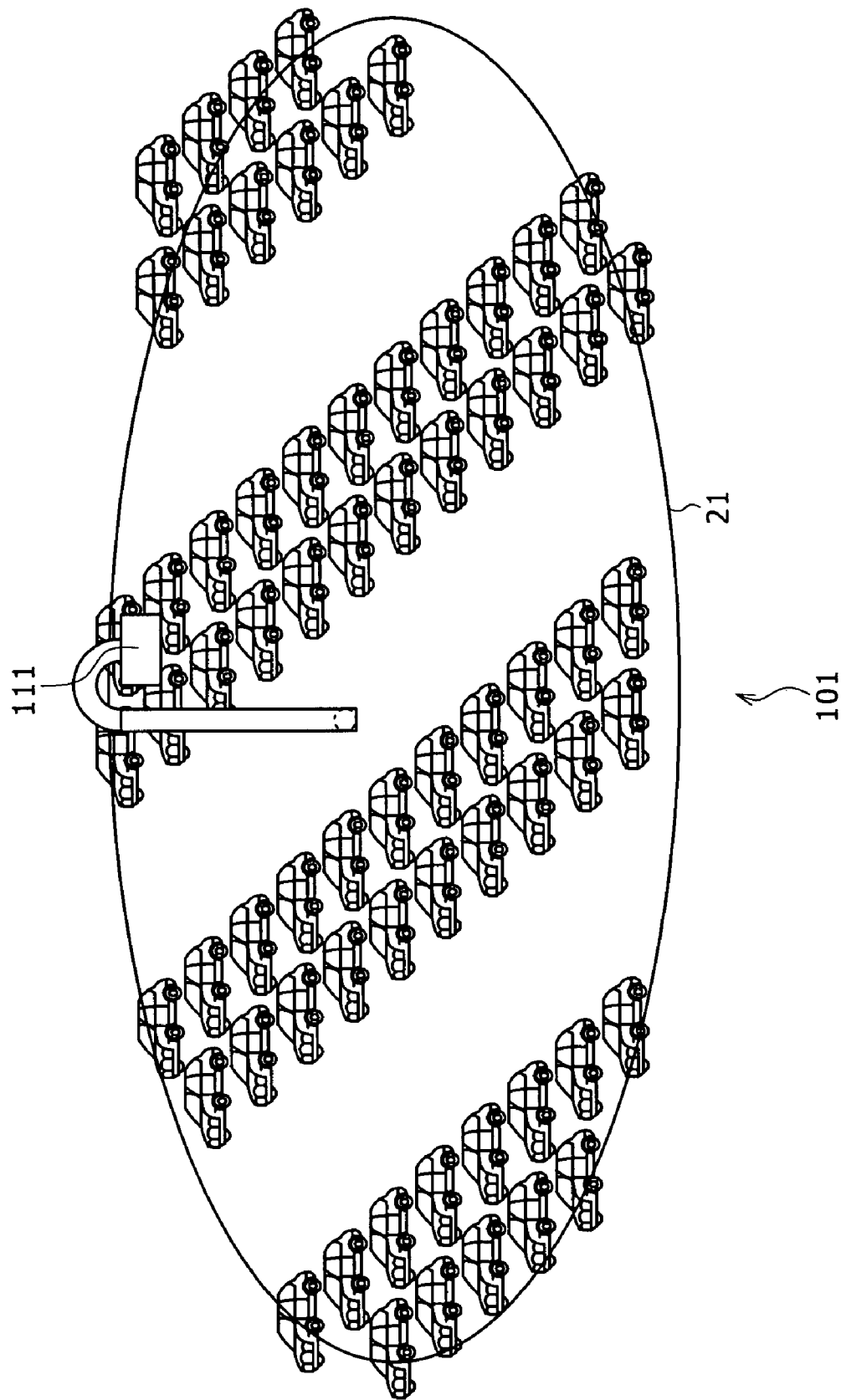
FIG. 4 is a view showing an example of an appearance of a monitoring system to which the present invention is applied.

FIG. 4 shows an example of an appearance of a monitoring system 101 to which the present invention is applied.

Figure 5:
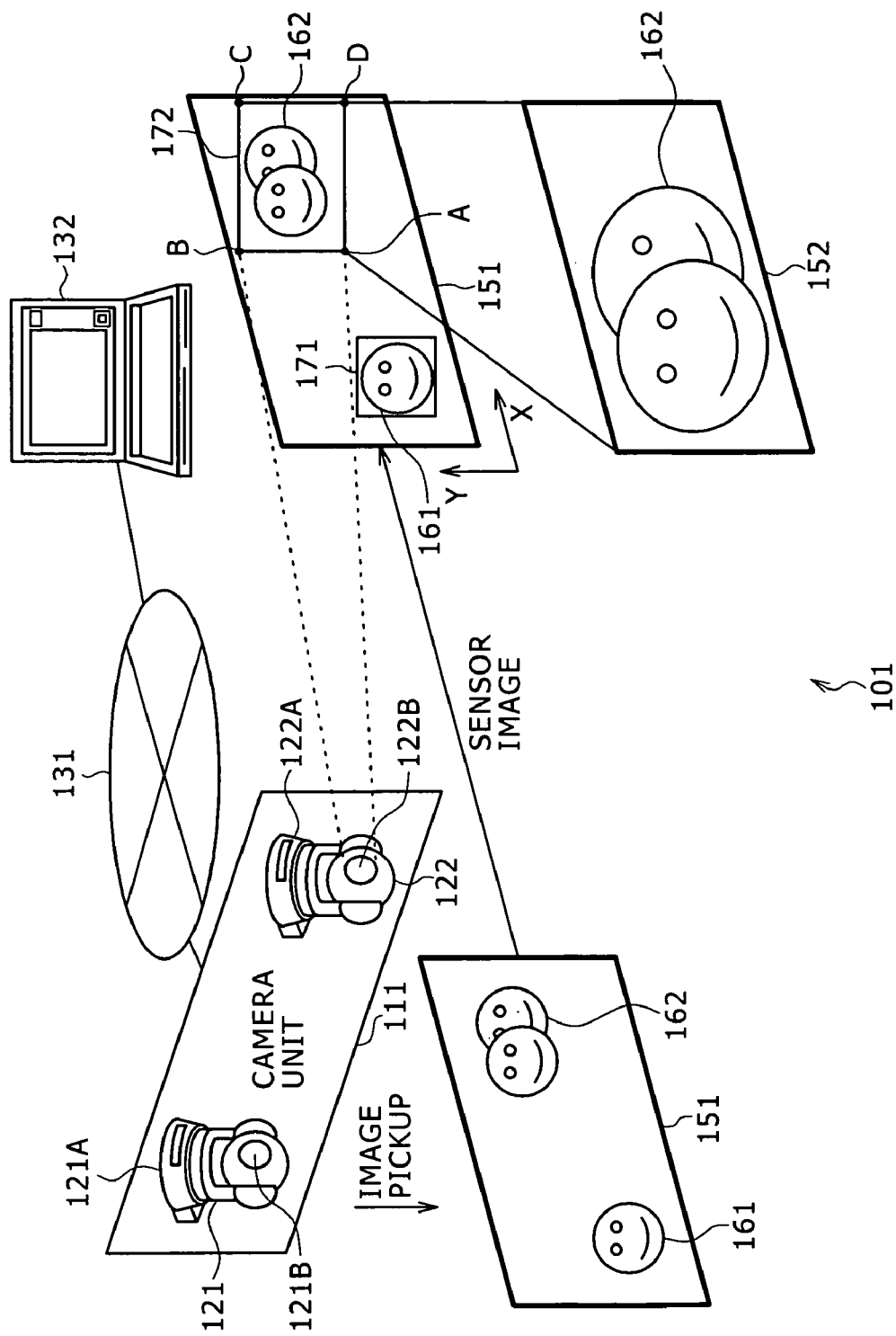
FIG. 5 is a schematic view showing an example of a configuration of the monitoring system shown in FIG. 4.

Referring to FIG. 4, the monitoring system 101 shown includes a camera unit 111. Referring to FIG. 5, the camera unit 111 includes a sensor camera 121 for picking up a region of a wide area, and a zoom camera 122 for picking up an image of a predetermined moving body in a zoomed (enlarged) state. The sensor camera 121 picks up an image of a region of a wide area, and the zoom camera 122 zooms and picks up an image of a moving body detected from within a sensor image 151 obtained by the image pickup by the sensor camera 121. Consequently, according to the monitoring system 101 shown in FIG. 4, a region 21 of a cylindrical wide area, for example, of a diameter of 40 m in a parking area can monitored.

Figure 1:
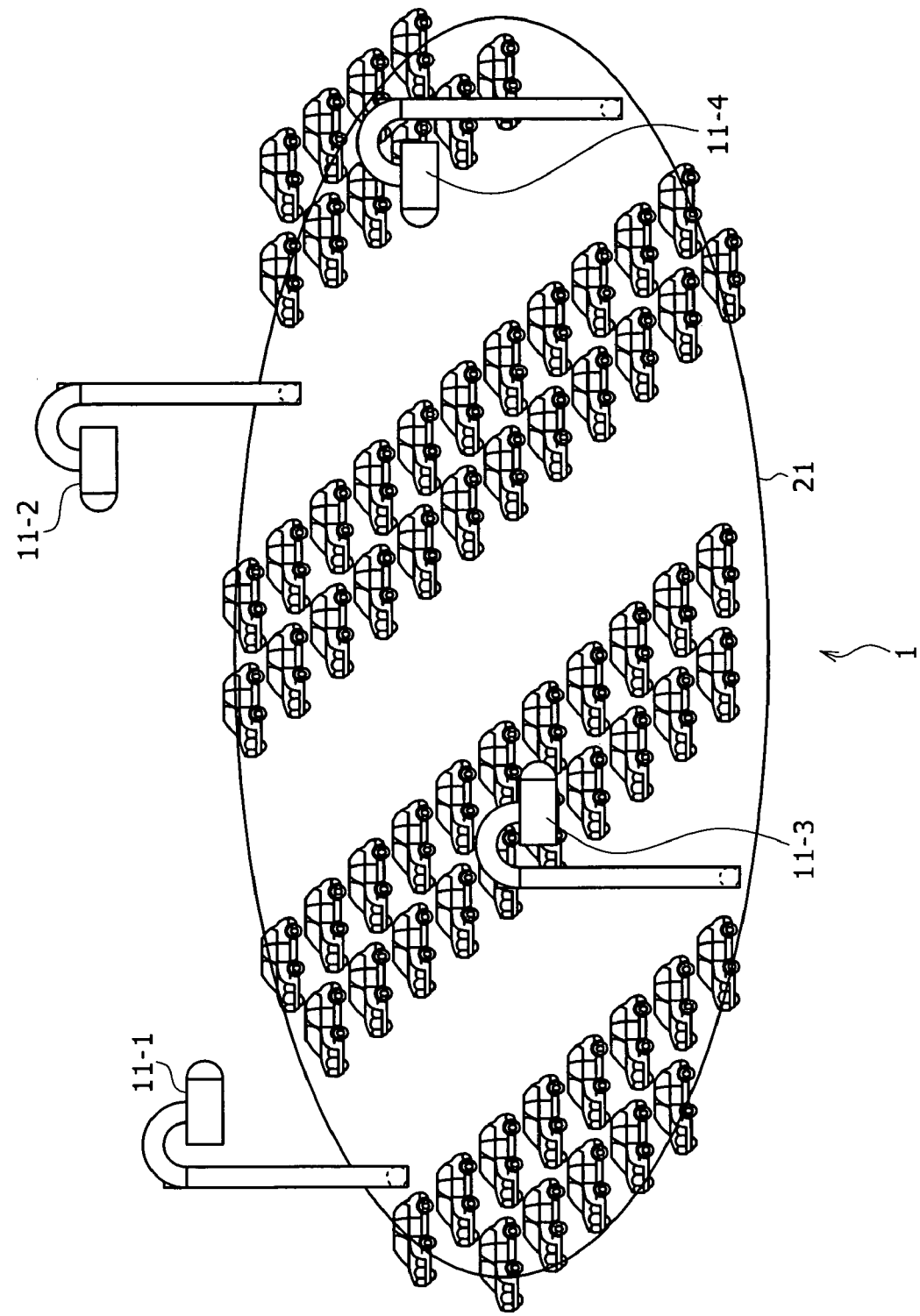
FIG. 1 is a schematic view showing an appearance of an example of a conventional multi camera system.
Figure 2:
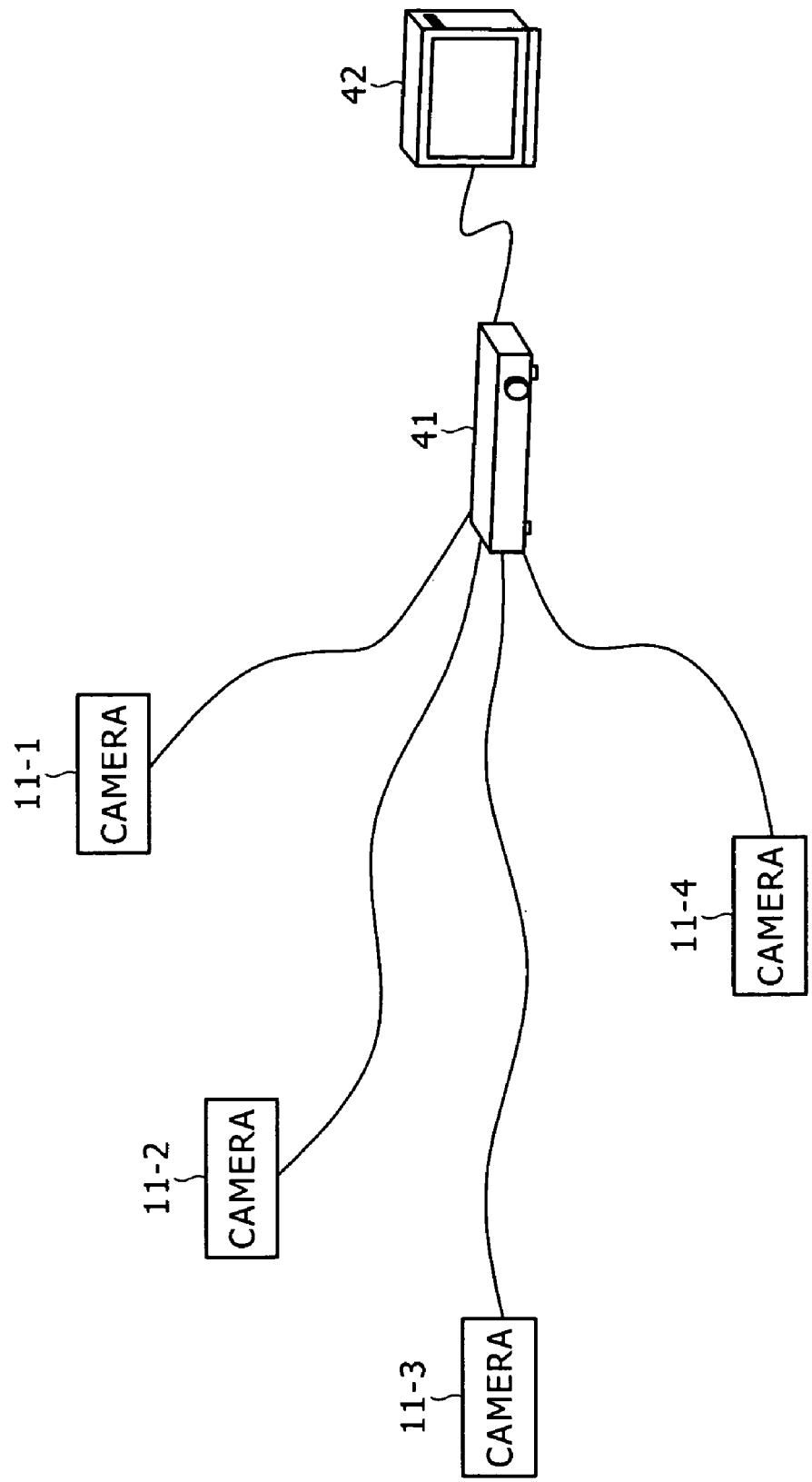
FIG. 2 is a schematic view showing an example of a configuration of the multi camera system of FIG. 1.
Figure 3:
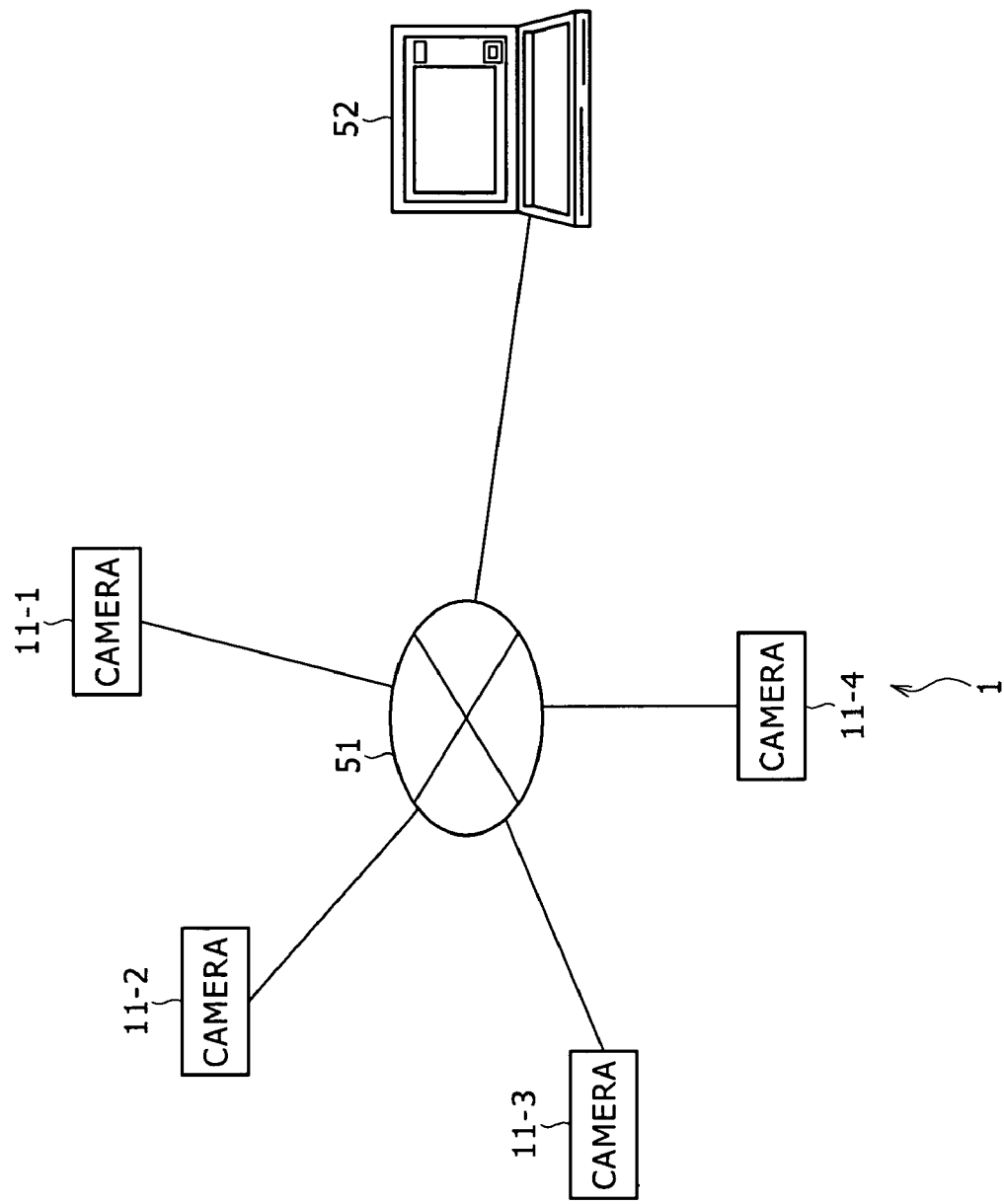
FIG. 3 is a similar view but showing another example of the configuration of the multi camera system of FIG. 1.

As a result, the monitoring system 101 shown in FIG. 4 requires a reduced number of cameras when compared with the multi camera system 1 shown in FIG. 1 and can be installed readily and produced at a reduced cost.

FIG. 5 shows an example of a configuration of the monitoring system 101.

Referring to FIG. 5, the monitoring system 101 includes a camera unit 111 which includes a sensor camera 121 and a zoom camera 122, a network 131, and a client 132. The monitoring system 101 records a sensor image 151 acquired by the sensor camera 121 and a zoom image 152 obtained by image pickup by means of the zoom camera 122 into the client 132 through the network 131 and reproduces the thus recorded sensor image 151 and zoom image 152 by means of the client 132.

The sensor camera 121 of the camera unit 111 includes a pan tilt section 121A and a camera section 121B which are formed as a unitary member. The pan tilt section 121A is formed as a rotatable table for changing the image pickup direction freely, for example, with regard to two axes for panning and tilting (horizontal direction and vertical direction). The camera section 121B is disposed on the rotatable table which forms the pan tilt section 121A and controls the pan tilt section 121A under the control of the client 132 to adjust the horizontal or vertical direction of the image pickup direction and change the angle of view of image pickup to expand or reduce the image pickup magnification to pick up an image of (a subject of) a wide area as moving pictures. In particular, for example, the camera section 121B successively shifts the image pickup direction to pick up an image of a subject thereby to acquire a plurality of unit images and produces a sensor image 151 of a panorama image composed of the plural unit images.

The camera section 121B supplies the sensor image 151 obtained by the image pickup to the client 132 through the network 131. In FIG. 5, the sensor camera 121 picks up an image of a wide area including moving bodies 161 and 162 to acquire a sensor image 151 in which the moving bodies 161 and 162 are included.

The zoom camera 122 includes a pan tilt section 122A and a camera section 122B which are formed as a unitary member similarly to the sensor camera 121. The pan tilt section 122A is formed as a rotatable table for changing the image pickup direction freely, for example, with regard to the two axes for panning and tilting similarly as in the sensor camera 121. The camera section 122B is disposed on the rotatable table which forms the pan tilt section 122A and controls the pan tilt section 122A under the control of the client 132 to adjust the horizontal or vertical direction of the image pickup direction and change the angle of view of image pickup to increase or decrease the image pickup magnification to pick up a predetermined moving body as zoomed moving pictures.

The client 132 detects the moving bodies 161 and 162 included in the sensor image 151 supplied thereto from the sensor camera 121 and determines a predetermined region (for example, a rectangular region) surrounding each of the moving bodies 161 and 162 as a moving body framework 171 or 172.

The client 132 supplies, for example, coordinates of the four vertices A to D of the moving body framework 172 on the X axis (axis in the horizontal direction in FIG. 5) and the Y axis (axis in the vertical direction) on the sensor image 151 to the zoom camera 122. The zoom camera 122 performs zoom image pickup of (the moving body framework 172 of) the moving body 162 based on the coordinates to acquire the zoom image 152. It is to be noted that, in the following description, the sensor image 151 and the zoom image 152 are acquired in a unit of a frame. The zoom camera 122 supplies the zoom image 152 to the client 132 through the network 131.

The network 131 is a communication network which allows bidirectional communication of data and may be, for example, the Internet network connected through a telephone circuit to the client 132 or an ISDN (Integrated Services Digital Network)/B (broadband)-ISDN, a LAN (Local Area Network) or the like connected to a TA (Terminal Adapter) or a modem.

The client 132 is formed, for example, from a personal computer and controls the sensor camera 121 and the zoom camera 122 through the network 131. Further, the client 132 records a sensor image 151 from the sensor camera 121 and a zoom image 152 from the zoom camera 122, and reproduces the recorded sensor image 151 and zoom image 152 so as to be displayed.

Figure 6:
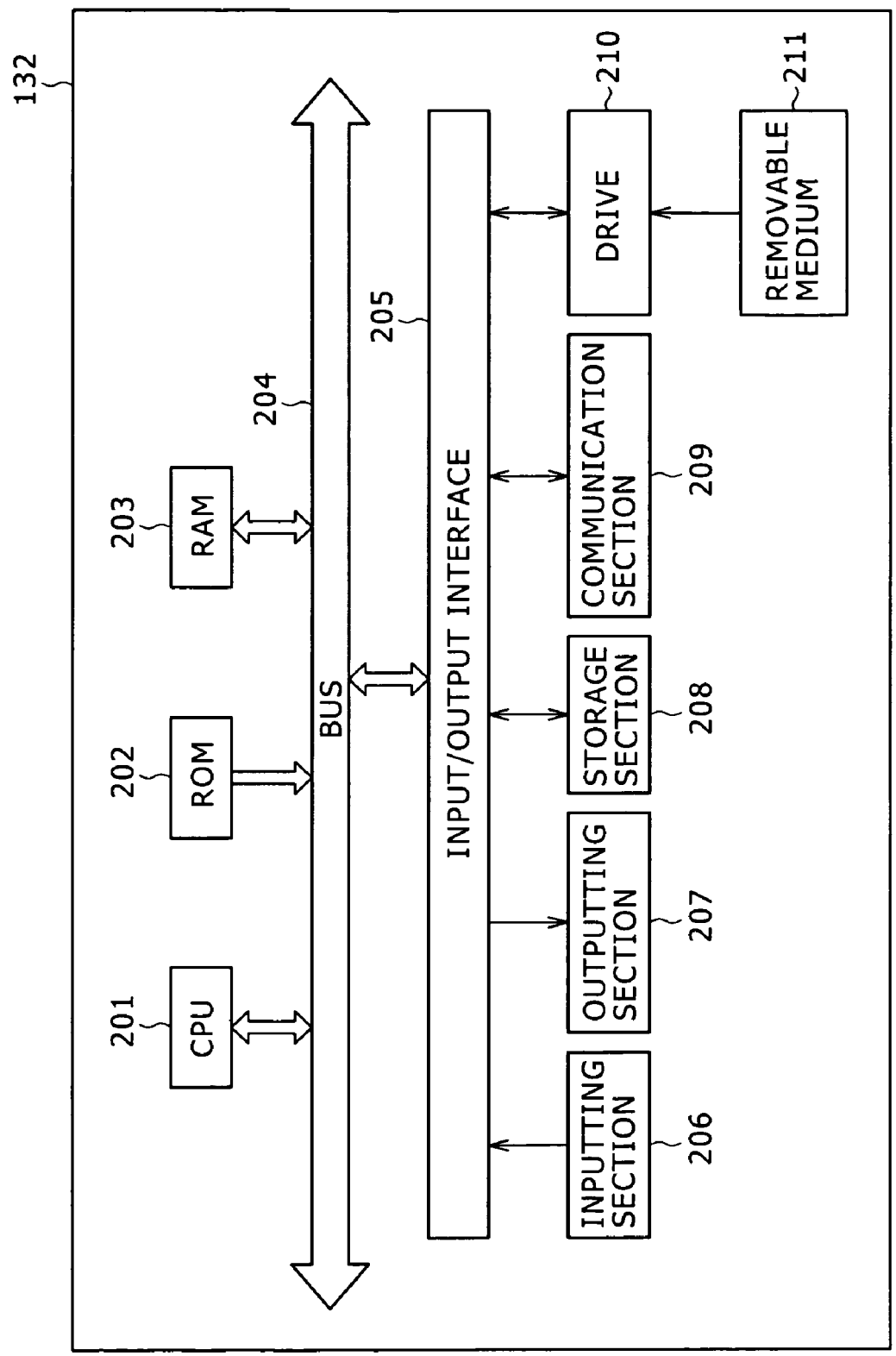
FIG. 6 is a block diagram showing an example of a configuration of a client shown in FIG. 5.

FIG. 6 shows an example of a configuration of the client 132 shown in FIG. 5.

Referring to FIG. 6, a central processing unit (CPU) 201 is connected to a read only memory (ROM) 202 and a random access memory (RAM) 203 through a bus 204. It is to be noted that the CPU 201, ROM 202 and RAM 203 form a microcomputer. Also an input/output interface 205 is connected to the bus 204.

The CPU 201 executes various processes in accordance with a program stored in the ROM 202 or a program stored in the RAM 203. The ROM 202 has various programs stored therein. The RAM 203 stores a program acquired through a communication section 209. Further, the RAM 203 suitably stores data and so forth necessary for the CPU 201 to execute various processes.

An inputting section 206 including a keyboard, a mouse, a microphone and so forth, an outputting section 207 including an liquid crystal display (LCD) unit, a speaker and so forth, a storage section 208 formed from a hard disk and so forth and a communication section 209 formed from a TA, a modem or the like are connected to the input/output interface 205. The communication section 209 is connected to the network 131 of FIG. 5 and communicates with the sensor camera 121 and the zoom camera 122 through the network 131.

A drive 210 is suitably connected the input/output interface 205 as occasion demands, and a program is read out from a removable medium 211 loaded in the drive 210 and installed into the storage section 208. The CPU 201 loads the program installed in the RAM 203, for example, into the RAM 203 and executes the program.

FIG. 7 shows an example of a functional configuration of the client 132 shown in FIG. 5.

Referring to FIG. 7, the client 132 shown includes a sensor image acquisition module 221, a moving body detection module 222, a tracking object image acquisition module 223, an angle-of-view calculation module 224, a tracking object designation module 227, an image pickup mode changeover module 228 and a reproduction module 229 which correspond, for example, to the CPU 201 shown in FIG. 6. The client 132 further includes a tracking object information management database (DB) 225 and a display information DB 226 which correspond, for example, to the storage section 208 of FIG. 6.

An instruction to acquire a sensor image 151 is supplied from the inputting section 206 to the sensor image acquisition module 221 in response to an operation of a user. The sensor camera 121 picks up an image of the region 21 of a wide area under the control of the sensor image acquisition module 221 and supplies a resulting sensor image 151 to the sensor image acquisition module 221. The sensor image acquisition module 221 supplies the sensor image 151 from the sensor camera 121 to the moving body detection module 222.

The sensor image acquisition module 221 produces display information based on an appearance position of a moving body represented by the coordinates of the vertices A to D of a moving body framework supplied from the moving body detection module 222. The sensor image acquisition module 221 produces a predetermined file in the display information DB 226 and registers the display information and the sensor image 151 into the file.

The moving body detection module 222 detects appearance of moving bodies existing in the image pickup region of the sensor image 151 based on the sensor image 151 supplied thereto from the sensor image acquisition module 221 and applies an ID (identifier; hereinafter referred to as moving body ID) to each moving body whose appearance is detected. The moving body detection module 222 determines a moving body framework of each moving body whose appearance is detected and determines the coordinates of the vertices A to D of the moving body framework as an appearance position of the moving body. The moving body detection module 222 supplies the moving body IDs and the appearance positions to the sensor image acquisition module 221 and the angle-of-view calculation module 224.

The tracking object image acquisition module 223 acquires tracking object information including an angle of view of image pickup and a moving body ID corresponding to the tracking object from the tracking object information management DB 25. The tracking object image acquisition module 223 controls the zoom camera 122 based on the angle of view of image pickup of the tracking object information to pick up a zoom image of the moving body as moving pictures (tracking image pickup). The tracking object image acquisition module 223 registers the zoom image 152 obtained as a result of the zoom image pickup in a coordinated relationship with the moving body ID of the moving body of the tracking object included in the tracking object information.

The angle-of-view calculation module 224 determines a moving body as a tracking object based on the moving body ID of the moving body of the tracking object supplied from the tracking object designation module 227, an image pickup mode supplied from the image pickup mode changeover module 228 and the moving body ID and the appearance position supplied from the moving body detection module 222. Thus, the angle-of-view calculation module 224 determines the angle of view of image pickup for imaging the area including the moving body. The angle-of-view calculation module 224 supplies the angle of view of image pickup and the moving body ID corresponding to the tracking object as tracking object information to the tracking object information management DB 225.

The tracking object information management DB 225 stores the tracking object information from the moving body detection module 222. The display information DB 226 stores the display information and the sensor image 151 from the sensor image acquisition module 221.

The tracking object designation module 227 acquires the moving body ID of the moving body of the tracking object from the display information DB 226 based on the tracking object information supplied from the inputting section 206 in response to an operation of the user and designating the tracking object. The tracking object designation module 227 supplies the moving body ID to the angle-of-view calculation module 224. Further, the tracking object designation module 227 detects disappearance of the moving body of the tracking object from within the sensor image 151 based on the display information registered in the display information DB 226 and supplies disappearance detection information representative of a result of the detection to the image pickup mode changeover module 228.

The image pickup mode changeover module 228 sets the image pickup mode to a continuous tracking mode in which a moving body is tracked to effect successively pick up a zoom image or a cyclic image pickup mode in which images of the detected moving bodies are successively picked up based on changeover information supplied from the inputting section 206 in response to an operation of the user and indicative of changeover of the image pickup mode or the tracking object information supplied from the tracking object designation module 227. The image pickup mode changeover module 228 supplies the set image pickup mode to the angle-of-view calculation module 224.

The reproduction module 229 reproduces the sensor image 151 from the display information DB 226 in accordance with an instruction to acquire a sensor image 151 supplied from the inputting section 206 in response to an operation of the user and reproduces the zoom image 152, and then causes the outputting section 207 to display the sensor image 151 and the zoom image 152. Further, the reproduction module 229 reads out the display information from the display information DB 226 and causes a moving body frame to be displayed on the sensor image 151 based on the appearance positions of the display information.

Figure 8:
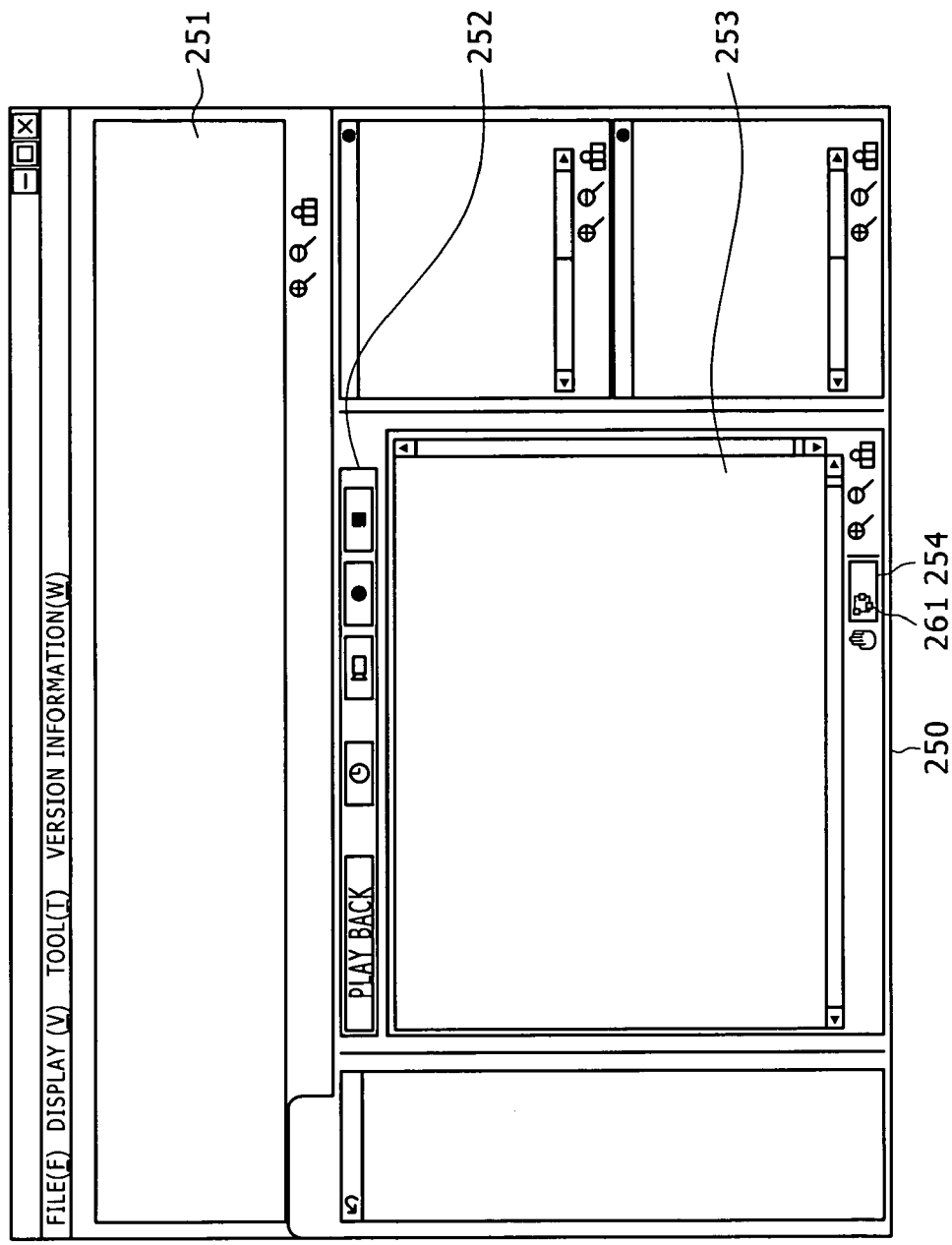
FIG. 8 is a schematic view showing an example of a screen displayed on an outputting section shown in FIG. 6.

An example of a screen to be displayed on the outputting section 207 of FIG. 6 is shown in FIG. 8.

When the user issues an instruction to acquire the sensor image 151, a screen 250 shown in FIG. 8 is displayed on the outputting section 207.

The screen 250 of FIG. 8 includes a sensor image display section 251 for displaying the sensor image 151, an operation section 252 for displaying a GUI (Graphical User Interface) through which an instruction to perform an operation relating to recording (picture recording) of the sensor image 151 and the zoom image 152 is to be issued, a zoom image display section 253 for displaying moving pictures of the zoom image 152, an image pickup mode selection section 254, and so forth.

The reproduction module 229 causes the sensor image display section 251 to display a sensor image being currently acquired and causes the zoom image display section 253 to display a moving picture of the zoom image 152 being currently acquired.

Figure 9:
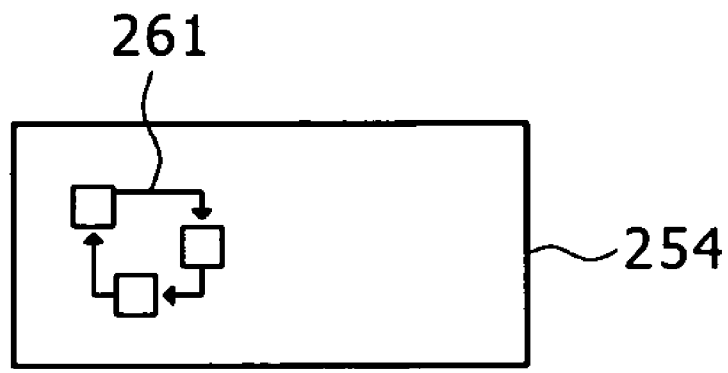
FIGS. 9 and 10 are views showing an example of an image pickup mode selection section displayed on the screen shown in FIG. 8.

It is to be noted that, in FIG. 8, the image pickup mode is set to the cyclic image pickup mode. In this instance, a cyclic image pickup button 261 representing that the image pickup mode is the cyclic image pickup mode is displayed, for example, emphatically in a color different from an ordinary display color in the image pickup mode selection section 254 as seen in FIG. 9.

Figure 10:
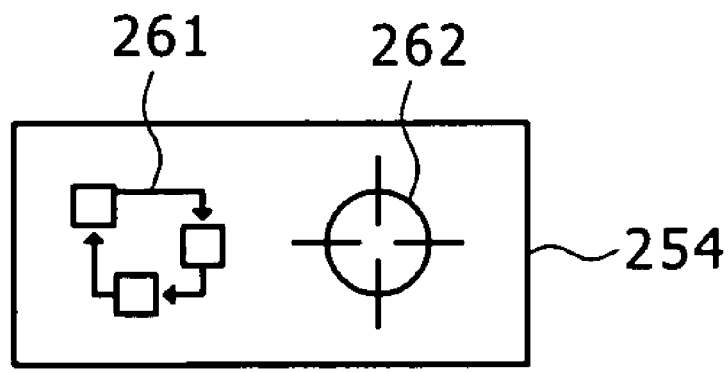

On the other hand, where the image pickup mode is set to the continuous tracking mode, the cyclic image pickup button 261 is displayed normally, for example, in a color different from that in FIG. 8, in the image pickup mode selection section 254 as seen in FIG. 10. Further, a continuous tracking button 262 representing that the image pickup mode is the continuous tracking mode is displayed emphatically in the image pickup mode selection section 254.

Now, details of the cyclic image pickup mode and the continuous tracking mode are described with reference to FIG. 11.

Where the image pickup mode is the cyclic image pickup mode, the zoom camera 122 performs zoom image pickup successively setting all of moving bodies detected by the moving body detection module 222 as an image pickup object. Further, the image pickup mode is set to the cyclic image pickup mode, as an opportunity of the cyclic image pickup mode, when image pickup is started or when the moving body of the tracking object disappears from within the sensor image 151 or else when the cyclic image pickup button 261 is clicked, which is an opportunity to end the continuous tracking mode as hereinafter described.

Where the image pickup mode is the cyclic image pickup mode, the cyclic image pickup button 261 is displayed emphatically in the image pickup mode selection section 254, but the continuous tracking button 262 is not displayed (disappears from the display). On the other hand, the image pickup mode changes over from the cyclic image pickup mode to the continuous tracking mode, as an opportunity to end the cyclic image pickup mode, when the user operates the inputting section 206 to designate (click) a moving body framework on the sensor image 151.

On the other hand, when the image pickup mode is the continuous tracking mode, the zoom camera 122 performs zoom image pickup setting one moving body corresponding to a moving body framework on the sensor image 151 designated as a tracking object in response to an operation of the inputting section 206 by the user as an image pickup object. Further, the image pickup mode is set to the continuous tracking mode, as an opportunity of the continuous tracking mode, when the cyclic image pickup mode is to be ended, that is, when the user operates the inputting section 206 to designate (click) a moving body framework on the sensor image 151.

When the image pickup mode is the continuous tracking mode, the cyclic image pickup button 261 is displayed normally in the image pickup mode selection section 254, and either the continuous tracking button 262 is displayed emphatically or the cyclic image pickup button 261 is not displayed but the continuous tracking button 262 is displayed emphatically. On the other hand, the image pickup mode changes over from the continuous tracking mode to the cyclic image pickup mode, as an opportunity to end the continuous tracking mode, when the moving body of the tracking object disappears from within the sensor image 151 or when the user operates the inputting section 206 to designate (click) the cyclic image pickup button 261. In other words, the cyclic image pickup button 261 has two functions of representing that the image pickup mode is the cyclic image pickup mode and changing the image pickup mode to the cyclic image pickup mode.

Now, a cyclic image pickup process which is executed by the client 132 when the image pickup mode is the cyclic image pickup mode is described with reference to FIG. 12. The cyclic image pickup process is started, for example, when the image pickup mode is set to the cyclic image pickup mode.

At step S1, the reproduction module 229 causes the cyclic image pickup button 261 of the image pickup mode selection section 254 to be displayed emphatically as seen in FIG. 8 or 9, whereafter the processing advances to step S2. At step S2, the reproduction module 229 erases the display of the continuous tracking button, 262. In other words, the reproduction module 229 stops the display of the continuous tracking button 262 in the image pickup mode selection section 254.

After the process at step S2, the processing advances to step S3, at which the reproduction module 229 reads out the sensor image 151 acquired by the sensor image acquisition module 221 and registered in the display information DB 226 and supplies the sensor image 151 to the sensor image display section 251 so as to be displayed. Thereafter, the processing advances to step S4.

At step S4, the reproduction module 229 reads out the zoom image 152 acquired by the tracking object image acquisition module 223 and registered in the display information DB 226 and supplies the zoom image 152 to the zoom image display section 253 so as to be displayed, whereafter the processing advances to step S5.

At step S5, the reproduction module 229 acquires the appearance position of the display information corresponding to the sensor image 151 displayed at step S3 from the display information DB 226. Thereafter, the processing advances to step S6.

At step S6, the reproduction module 229 causes a moving body framework 172 (FIG. 5) to be displayed on the sensor image 151 based on the appearance position acquired at step S5. Here, if a desired moving body to be set as a tracking object exists on the sensor image 151 displayed on the sensor image display section 251 of the screen 250, then the user would operate the inputting section 206 to designate the position of the desired moving body in the moving body framework 172 to designate a moving body to be made a tracking object.

After the process at step S6, the processing advances to step S7, at which the tracking object designation module 227 decides whether or not a position on the sensor image 151 is displayed by the user in response to designation position information representative of the position designated by the user and supplied from the inputting section 206.

If it is decided at step S7 that a position on the sensor image 151 is not designated, then the processing returns to step S3 so that the processes at the steps beginning with step S3 are repeated. On the other hand, if it is decided at step S7 that a position on the sensor image 151 is designated, then the processing advances to step S8, at which the tracking object designation module 227 decides whether or not the position designated by the user is on the inner side of the moving body framework 172.

If it is decided at step S8 that the position designated by the user is not on the inner side of the moving body framework 172, then the processing returns to step S3 so that the processes at the steps beginning with step S3 are repeated. On the other hand, if it is decided at step S8 that the position designated by the user is on the inner side of the moving body framework 172, then the processing advances to step S9, at which the tracking object designation module 227 acquires the moving body ID corresponding to the moving body framework 172 from the display information registered in the display information DB 226 and supplies the moving body ID to the angle-of-view calculation module 224 and the reproduction module 229.

After the process at step S9, the processing advances to step S10, at which the tracking object designation module 227 issues an instruction to change over the image pickup mode to the image pickup mode changeover module 228. Consequently, the image pickup mode changeover module 228 sets the image pickup mode to the continuous tracking mode and supplies image pickup mode information representative of the changeover of the image pickup mode to the continuous tracking mode to the angle-of-view calculation module 224. Thereafter, the processing is ended.

As described above, the monitoring system 101 can track a desired moving body and successively pick up a zoom image of the moving body in response to a simple, easy and intuitive operation by the user of designating a moving body framework of the desired moving body.

Now, the continuous tracking process executed by the client 132 when the image pickup mode is the continuous tracking mode is described with reference to FIG. 13. This continuous tracking process is started, for example, when the image pickup mode is set to the continuous tracking mode at step S10 of FIG. 12.

At step S21, the reproduction module 229 causes the cyclic image pickup button 261 of the image pickup mode selection section 254 to be displayed normally as seen in FIG. 10, whereafter the processing advances to step S22. At step S22, the reproduction module 229 causes the continuous tracking button 262 to be displayed emphatically, whereafter the processing advances to step S23.

At steps S23 to S26, processes similar to those at steps S3 to S6 of FIG. 12, respectively, are executed. Therefore, overlapping description of the processes is omitted herein to avoid redundancy.

After the process at step S26, the processing advances to step S27, at which the reproduction module 229 decides whether or not the tracking object exists on the sensor image 151 based on the moving body ID supplied from the tracking object designation module 227 at step S9. In particular, the reproduction module 229 decides whether or not the display information corresponding to the sensor image 151 displayed at step S23 and registered in the display information DB 226 includes the moving body ID supplied from the tracking object designation module 227.

If it is decided at step S27 that the tracking object does not exist on the sensor image 151, that is, that the display information corresponding to the sensor image 151 does not include the moving body ID of the tracking object supplied from the tracking object designation module 227, then the reproduction module 229 supplies disappearance detection information representing disappearance of the tracking object to the tracking object designation module 227. Thereafter, the processing advances to step S34.

At step S34, the tracking object designation module 227 issues an instruction to change over the image pickup mode to the image pickup mode changeover module 228. Consequently, the image pickup mode changeover module 228 sets the image pickup mode now to the cyclic image pickup mode. Then, the image pickup mode changeover module 228 supplies image pickup mode information representative of the changeover of the image pickup mode to the cyclic image pickup mode to the angle-of-view calculation module 224. Thereafter, the processing is ended.

On the other hand, if it is decided at step S27 that the tracking object exists on the sensor image 151, that is, that the display information corresponding to the sensor image 151 includes the moving body ID of the tracking object supplied from the tracking object designation module 227, then the processing advances to step S28. At step S28, the reproduction module 229 causes the moving body framework 172 of the tracking object to be displayed emphatically, for example, in a color different from that in the normal display on the sensor image 151 based on the appearance position included in the display information. Consequently, the user can recognize readily which one of the moving bodies appearing on the sensor image 151 displayed currently is set as the tracking object.

It is to be noted that the moving body framework 172 of the tracking object may not be displayed emphatically but the color or the shape of a cursor displayed in the moving body framework 172 may be changed from that of another cursor displayed in another moving body framework 172.

After the process at step S28, the processing advances to step S29, at which the image pickup mode changeover module 228 decides whether or not the cyclic image pickup button 261 is operated by the user, that is, whether or not information representing that the cyclic image pickup button 261 is operated by the user is supplied from the inputting section 206.

If it is decided at step S29 that the cyclic image pickup button 261 is operated by the user, then the processing advances to step S34, at which the image pickup mode changeover module 228 sets the image pickup mode to the cyclic image pickup mode and supplies image pickup mode information representative of the changeover of the image pickup mode to the cyclic image pickup mode to the angle-of-view calculation module 224 as described hereinabove. Thereafter, the processing is ended.

On the other hand, if it is decided at step S29 that the cyclic image pickup button 261 is not operated by the user, then the processing advances to step S30. At steps S30 to S32, similar processes to those at steps S7 to S9 of FIG. 12 described hereinabove are executed. There, overlapping description of the processes is omitted herein to avoid redundancy.

After the process at step S32, the processing advances to step S33, at which the tracking object designation module 227 changes over the tracking object. In particular, the tracking object designation module 227 acquires the moving body ID corresponding to the moving body framework 172 including the position designated by the user from the display information registered in the display information DB 226 and sets the moving body corresponding to the moving body ID as a new tracking object. Then, the tracking object designation module 227 supplies the moving body ID acquired from the display information as the moving body ID of the moving body of the new tracking object to the angle-of-view calculation module 224, whereafter the processing returns to step S23.

Figure 14:
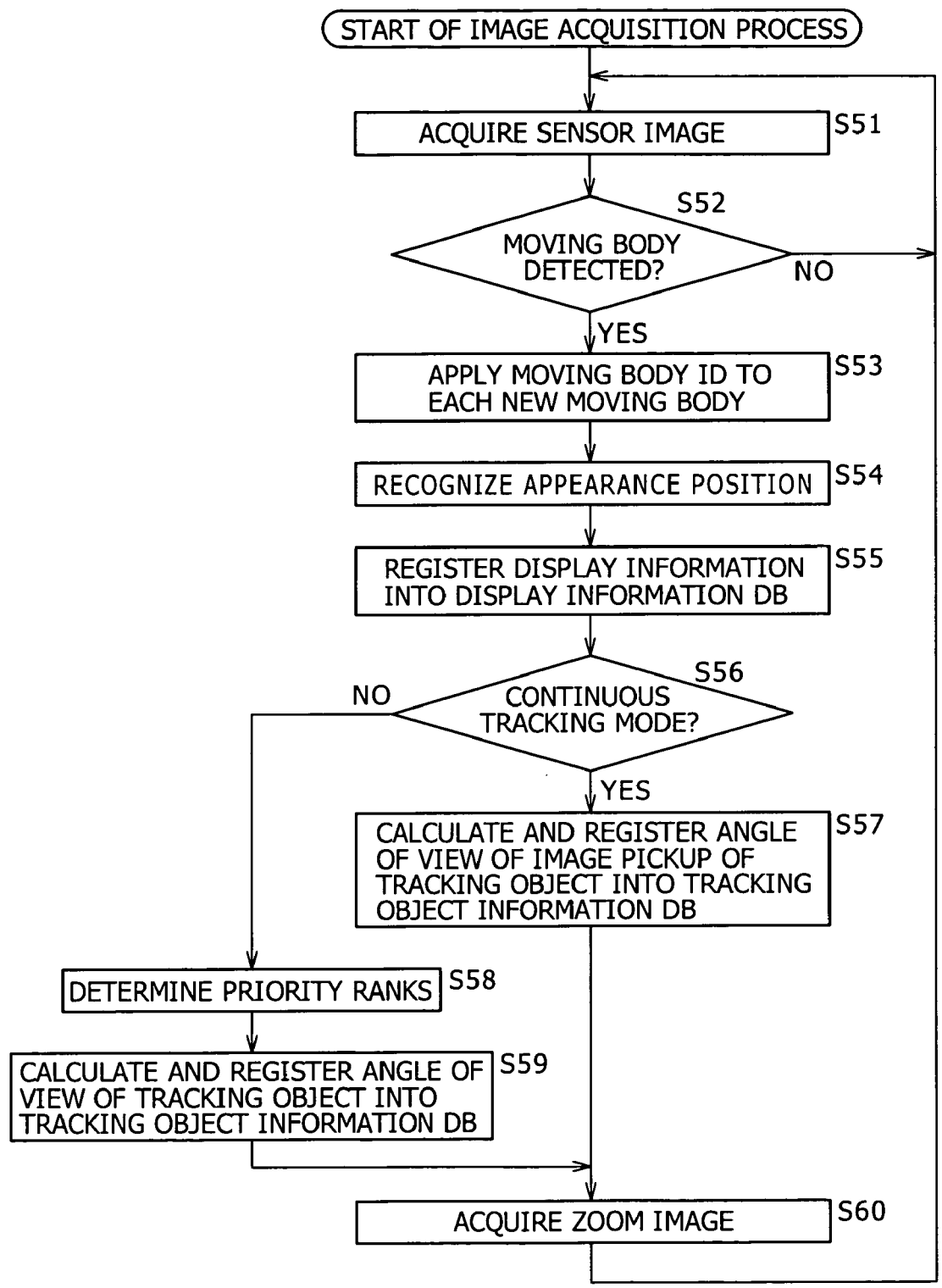
FIG. 14 is a flow chart illustrating an image acquisition process for acquiring a sensor image and a zoom image by the client shown in FIG. 5.

Now, an image acquisition process for acquiring the sensor image 151 and the zoom image 152 by the client 132 is described with reference to FIG. 14. This image acquisition process is started, for example, when the user operates the inputting section 206 to issue a request for acquisition of the sensor image 151.

At step S51, the sensor image acquisition module 221 controls the sensor camera 121 to pick up an image of the region of a wide area and acquires and supplies the zoom image 152 obtained by the image pickup to the moving body detection module 222.

After the process at step S51, the processing advances to step S52, at which the moving body detection module 222 decides whether or not a moving body is detected from within the sensor image 151 from the sensor image acquisition module 221. More particularly, the moving body detection module 222 determines a difference value in luminance level between the sensor image 151 supplied from the sensor image acquisition module 221 and another sensor image 151 acquired in the preceding operation cycle. Then, if the difference value in luminance level exceeds a threshold value set in advance upon manufacture by a manufacturing source, then the moving body detection module 222 detects any aggregate of pixels which form the sensor image 151 corresponding to the luminance level as a moving body and decides that a moving body is detected.

It is to be noted that, if the moving body detection module 222 does not detect any moving body which has been detected till then, it detects disappearance of the moving body from the sensor image 151.

If it is decided at step S52 that no moving body is detected, then the processing returns to step S51 so that the process of acquiring the sensor image 151 is repeated until after a moving body or bodies are detected. On the other hand, if it is decided at step S52 that a moving body or bodies are detected, then the processing advances to step S53, at which the moving body detection module 222 applies a moving body ID to each new moving body from among the detected moving bodies. In particular, the moving body detection module 222 decides whether or not each moving body detected now is a new moving body which has not been detected till then, for example, based on the difference value in luminance level detected at step S52, the aggregate of pixels detected as the moving body and so forth. Then, the moving body detection module 222 applies a moving body ID to each moving body which is decided as being a new moving body.

After the process at step S53, the processing advance to step S54, at which the moving body detection module 222 recognizes the appearance position of each moving body on the sensor image 151 from the aggregate of pixels detected as a moving body at step S51. The moving body detection module 222 supplies the moving body IDs and the appearance positions of all of the moving bodies detected at step S51 as display information to the sensor image acquisition module 221 and the angle-of-view calculation module 224.

After the process at step S54, the processing advances to step S55, at which the sensor image acquisition module 221 registers the display information and the sensor image 151 acquired at step S51 in a coordinated relationship with each other into the display information DB 226.

After the process at step S55, the processing advances to step S56, at which the angle-of-view calculation module 224 decides whether or not the image pickup mode is the continuous tracking mode, that is, whether or not image pickup mode information representative of changeover of the image pickup mode to the continuous tracking mode is supplied from the image pickup mode changeover module 228 at step S10 of FIG. 12.

If it is decided at step S56 that the image pickup mode is the continuous tracking mode, then the angle-of-view calculation module 224 recognizes, at step S57, the appearance position of the moving body of the tracking object based on the moving body ID supplied at step S54, the appearance position corresponding to the moving body ID, and the moving body ID of the moving body of the tracking object supplied from the tracking object designation module 227 at step S9 of FIG. 12 or at step S33 of FIG. 13. In other words, the angle-of-view calculation module 224 recognizes the appearance position corresponding to the moving body of the tracking object from the moving body ID supplied at step S54 and the appearance position corresponding to the moving body ID.

Then, the angle-of-view calculation module 224 calculates the angle of view of image pickup of the zoom camera 122 for picking up an image of the recognized appearance position as the angle of view of image pickup of the tracking object and registers the angle of view of image pickup and the corresponding moving body ID as tracking object information into the tracking object information management DB 225.

On the other hand, if it is decided at step S56 that the image pickup mode is not the continuous tracking mode, that is, the image pickup mode is the cyclic image pickup mode, then the processing advances to step S58. At step S58, the angle-of-view calculation module 224 determines priority ranks of the moving bodies of the moving body IDs in zoom image pickup based on the moving body IDs supplied at step S54 and the corresponding appearance positions.

The following six methods are available for the angle-of-view calculation module 224 to determine the priority ranks.

The first method determines a priority rank such that the priority rank of a moving body whose appearance is detected newly is higher than that of any moving body detected already. In this instance, since the zoom image 152 of the moving body whose appearance is detected newly is acquired preferentially, for example, an invader can be found readily.

The second method determines a priority rank such that the priority rank of a moving body which is positioned at a higher position has a higher priority rank than that of another moving body which is positioned at a lower position. In this instance, since the zoom image 152 of a moving body positioned at a higher position is acquired preferentially, zoom image pickup of the face of a human being which generally is positioned at a high position is likely to be acquired. Consequently, an invader can be specified readily.

The third method determines a priority rank such that the priority rank of a moving body which is positioned at a lower position has a higher priority rank than that of another moving body which is positioned at a higher position. In this instance, since the zoom image 152 of a moving body positioned at a lower position is acquired preferentially, where the sensor camera 121 is installed at a high position such as on a building outdoors, the zoom image 152 of a human being or a vehicle which is positioned at a comparatively near position than a high place such as the sky or buildings can be acquired readily.

The fourth method determines a priority rank such that the priority rank of a moving body which has a comparatively great size has a higher priority rank than that of another moving body which has a comparatively small size. In this instance, since the zoom image 152 of a moving body having a great size is acquired preferentially, the zoom image 152 of a moving body which is located nearby can be acquired more likely than that of another moving body which is located remotely.

The fifth method determines a priority rank such that the priority rank of a moving body which has a comparatively small size has a higher priority rank than that of another moving body which has a comparatively large size. In this instance, since the zoom image 152 of a moving body having a small size is acquired preferentially, the zoom image 152 of a moving body such as human being or a vehicle which is located remotely can be acquired more likely than that of another moving body which is located nearby.

The sixth method determines a priority rank such that a vertically elongated moving body has a higher priority rank. In this instance, since the zoom image 152 of a vertically elongated moving body is acquired preferentially, the zoom image 152 of the whole body of a human being which generally is a vertically elongated moving body is acquired more likely.

One of such first to sixth methods for determining a priority rank as described above can be selected, for example, in response to an operation of the inputting section 206 by the user. The angle-of-view calculation module 224 determines the priority ranks of the moving bodies detected at step S52 in zoom image pickup in accordance with one of the first to sixth methods selected by the user.

After the process at step S58, the processing advances to step S59, at which the angle-of-view calculation module 224 sets the moving bodies corresponding to the priority ranks determined at step S58 successively as a tracking object in the descending order of the priority rank and calculates the angle of view of image pickup of the tracking object similarly to the process at step S57 based on the appearance position corresponding to the moving body. Then, the angle-of-view calculation module 224 registers the angle of view of image pickup and the corresponding moving body ID as tracking object information into the tracking object information management DB 225.

After the process at step S57 or S59, the processing advances to step S60, at which the tracking object image acquisition module 223 reads out the tracking object information from the tracking object information management DB 225. The tracking object image acquisition module 223 controls the zoom camera 122 based on the tracking object information to perform zoom image pickup of the tracking object and acquires the zoom image 152 obtained by the zoom image pickup. Thereafter, the processing returns to step S51.

Figure 15:
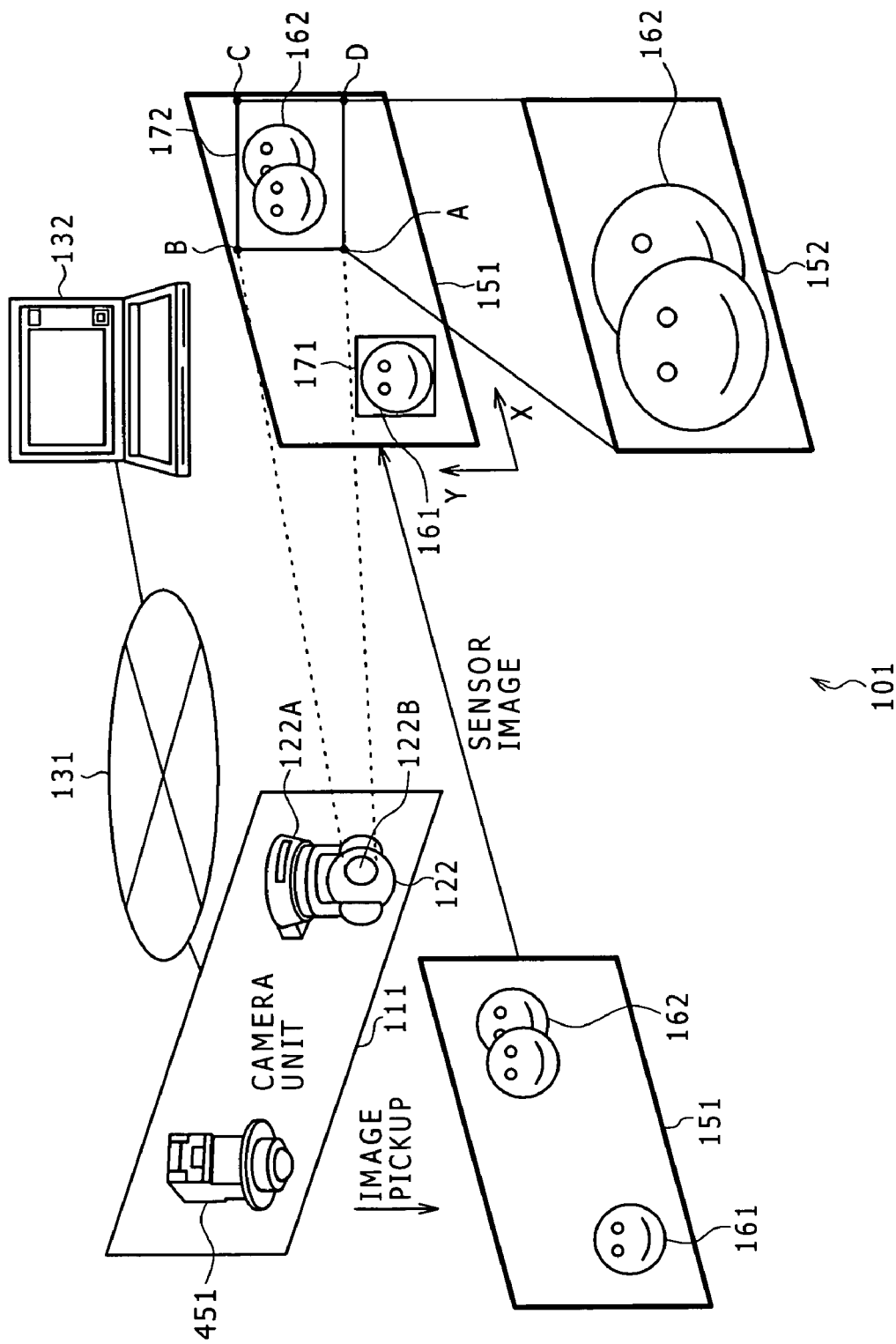
FIGS. 15 and 16 are schematic views showing different examples of the configuration of the monitoring system shown in FIG. 4.

FIG. 15 shows an example of the configuration of another form of the monitoring system 101 of FIG. 4.

The monitoring system 101 of FIG. 15 includes a stationary camera 451 which can perform omnidirectional image pickup over 360 degrees on the real time basis in place of the sensor camera 121 shown in FIG. 5.

Figure 16:
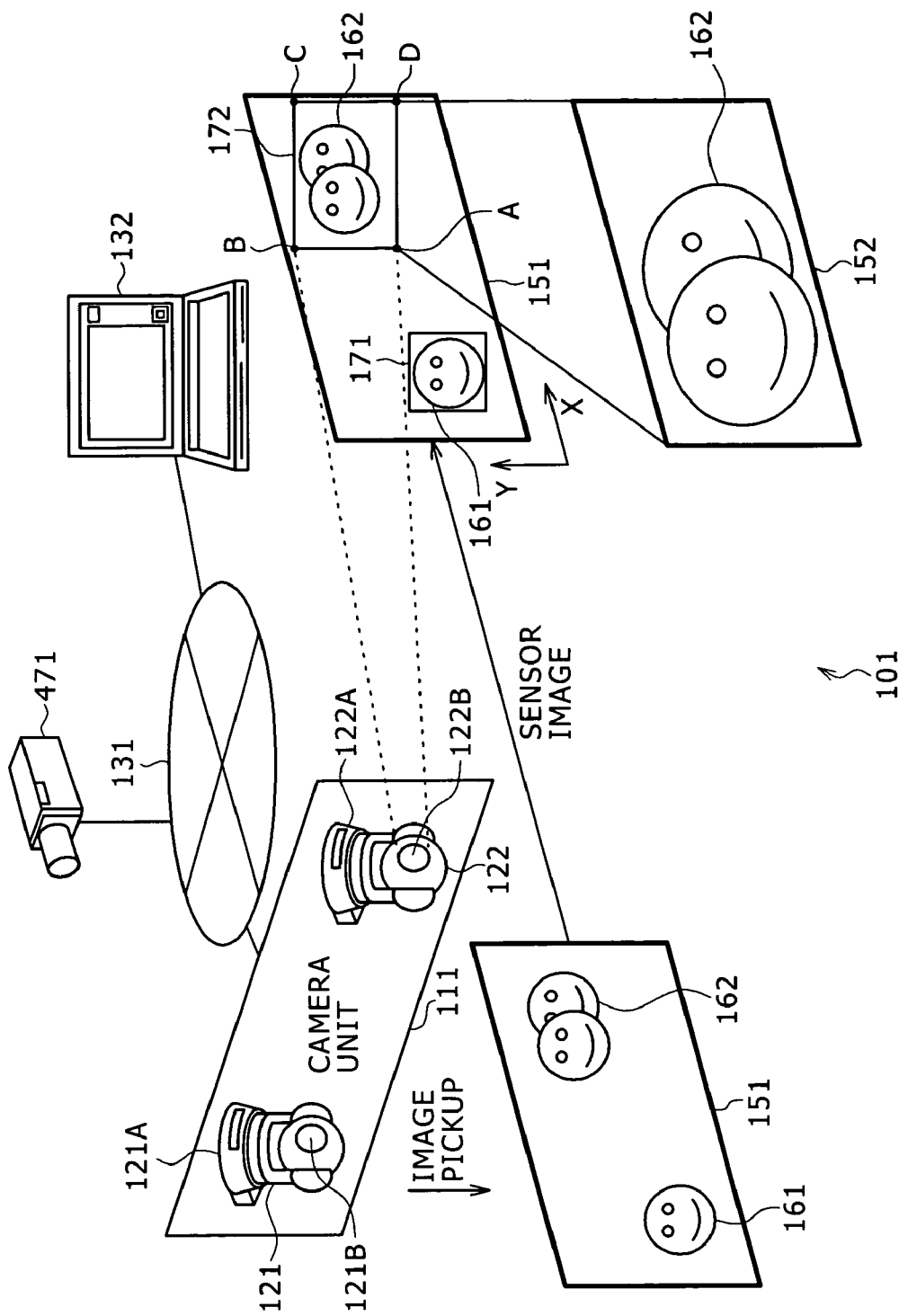

FIG. 16 shows an example of the configuration of a further form of the monitoring system 101 of FIG. 4.

In the monitoring system 101 of FIG. 16, a stationary camera 471 is provided additionally and connected to the network 131. In this instance, the moving body detection module 222 of the client 132 detects also moving bodies in a fixed image, which is moving pictures obtained by image pickup by the stationary camera 471, and causes also the fixed image to be displayed as occasion demands.

In this manner, in the monitoring system 101 of FIG. 16, since moving bodies not only on the sensor image 151 but also on the fixed image are detected, a region to be monitored can be increased. For example, if the stationary camera 471 is installed so as to monitor a fixed region in which many moving bodies appear such as a tollbooth or a gate of a parking area and the camera unit 111 is installed in order to monitor a wide area of the parking area, the entire parking area can be monitored with certainty.

It is to be noted that the blocks of the client 132 of FIG. 7 may be provided not in the client 132 but in the sensor camera 121 or the zoom camera 122.

Further, the application of the monitoring system 101 is not limited to monitoring of the region 21.

Furthermore, the sensor camera 121 and the zoom camera 122 are not limited to pan tilt cameras. Further, while, in the present embodiment, the monitoring system 101 includes two cameras of the sensor camera 121 and the zoom camera 122, the number of cameras is not limited to this, but a single camera may be used to acquire the sensor image 151 and the zoom image 152.

In summary, the monitoring system 101 is configured such that it picks up an image of the region 21, detects moving bodies existing in the region 21 based on the sensor image 151 obtained by the image pickup and sets, if one of the detected moving bodies is designated, the image pickup mode to the continuous tracking mode from between the cyclic image pickup mode wherein images of the moving bodies are picked up successively and the continuous tracking mode wherein one of the moving bodies is tracked to pick up an image of the moving body, it is possible to pick up an image of the region 21 and easily trace one of the moving bodies in the region 21 desired by the user to pick up an image of the moving body.

It is to be noted here that, in the present specification, the steps which describe the program recorded for causing a computer to execute various processes may be but need not necessarily be processed in a time series in the order as described in the flow charts, and include processes which are executed in parallel or individually (for example, parallel processing or process by an object).

Further, the program may be processed by a single computer or may be processed discretely by a plurality of computers. Furthermore, the program may be transferred to and executed by a computer located remotely.

While a preferred embodiment of the present invention has been described using specific terms, such description is for illustrative purpose only, and it is to be understood that changes and variations may be made without departing from the spirit or scope of the following claims.

What is claimed is:

1. An information processing system, comprising:
   region image pickup means for picking up an image of a predetermined region;
   detection means for detecting moving bodies existing in the predetermined region based on a region image obtained by the image pickup by said region image pickup means;
   designation means for designating one of the moving bodies detected by said detection means; and
   setting means for setting an image pickup mode to a cyclic image pickup mode in which images of the moving bodies detected by said detection means are successively picked up or a continuous tracking mode in which the moving body designated by said designation means is tracked to pick up an image of the moving body; wherein
   said setting means setting the image pickup mode to the continuous tracking mode when one of the moving bodies is designated by said designation means.

2. An information processing apparatus for controlling image pickup of a subject, comprising:
   region image pickup control means for controlling region image pickup means which picks up an image of a predetermined region, to pick up an image of the predetermined region;
   detection means for detecting moving bodies existing in the predetermined region based on a region image obtained by the image pickup by said region image pickup means;
   moving body image pickup control means for controlling moving body image pickup means which picks up images of the moving bodies detected by said detection means, to pick up images of the moving bodies;
   designation means for designating one of the moving bodies detected by said detection means; and
   setting means for setting an image pickup mode to a cyclic image pickup mode in which images of the moving bodies detected by said detection means are successively picked up or a continuous tracking mode in which the moving body designated by said designation means is tracked to pick up an image of the moving body; wherein
   said setting means setting the image pickup mode to the continuous tracking mode when one of the moving bodies is designated by said designation means.

3. The information processing apparatus according to claim 2, wherein said detection means detects also disappearance of any moving body detected already, and said setting means sets the image pickup mode to the cyclic image pickup mode when disappearance of the moving body designated by said designation means is detected by said detection means.

4. An information processing method for an information processing apparatus for controlling image pickup of a subject, comprising the steps of:
   controlling region image pickup means which picks up an image of a predetermined region, to pick up an image of the predetermined region;
   detecting moving bodies existing in the predetermined region based on a region image obtained by the image pickup by said region image pickup means;
   controlling moving body image pickup means which picks up images of the moving bodies detected by the process at the detecting step, to pick up images of the moving bodies;
   designating one of the moving bodies detected by the process at the detecting step; and
   setting an image pickup mode to a cyclic image pickup mode in which images of the moving bodies detected by the process at the detecting step are successively picked up or a continuous tracking mode in which the moving body designated by the process at the designating step is tracked to pick up an image of the moving body; wherein
   the process at the setting step setting the image pickup mode to the continuous tracking mode when one of the moving bodies is designated by the process at the designating step.

5. A computer readable medium encoded with a computer program that when executed on a computer cause the computer to perform a process of controlling image pickup of a subject, comprising the steps of:
   controlling with the computer a region image pickup device configured to pick up an image of a predetermined region;
   detecting moving bodies existing in the predetermined region based on a region image obtained by the image pickup in the step of controlling with the computer a region image pickup device;
   controlling a moving body image pickup device configured to pick up images of the moving bodies detected in the detecting step, to pick up images of the moving bodies;
   designating one of the moving bodies detected in at the detecting step; and
   setting an image pickup mode to a cyclic image pickup mode in which images of the moving bodies detected in the detecting step are successively picked up or a continuous tracking mode in which the moving body designated in the designating step is tracked to pick up an image of the moving body; wherein
   the setting step includes setting the image pickup mode to the continuous tracking mode when one of the moving bodies is designated in the designating step.

6. An apparatus for controlling image pickup of a subject comprising:
   a processor;
   a region image pickup device configured to capture a region image of a predetermined region;
   a moving body image device configured to capture image of moving bodies;
   a computer readable medium having recorded thereon instructions that when executed by the processor perform processes including
   controlling the region image pickup device to pick up the region image,
   detecting moving bodies existing in the predetermined region based on the region image obtained by the region image pickup device,
   controlling the moving body image pickup device to pick up the images of the moving bodies detected in the detecting step,
   designating one of the moving bodies detected by the process at the detecting step, and
   setting an image pickup mode to a cyclic image pickup mode in which images of the moving bodies detected in the detecting step are successively picked up or a continuous tracking mode in which the moving body designated in the designating step is tracked to pickup an image of the moving body, wherein
   the setting step includes setting the image pickup mode to the continuous tracking mode when one of the moving bodies is designated in the designating step.

7. An information processing system, comprising:

a region image pickup section for picking up an image of a predetermined region;

a detection section for detecting moving bodies existing in the predetermined region based on a region image obtained by the image pickup by said region image pickup section;

a designation section for designating one of the moving bodies detected by said detection section; and a setting section for setting an image pickup mode to a cyclic image pickup mode in which images of the moving bodies detected by said detection section are successively picked up or a continuous tracking mode in which the moving body designated by said designation section is tracked to pick up an image of the moving body; wherein said setting section setting the image pickup mode to the continuous tracking mode when one of the moving bodies is designated by said designation section.

8. An information processing apparatus for controlling image pickup of a subject, comprising:

a region image pickup control section for controlling a region image pickup section which picks up an image of a predetermined region, to pick up an image of the predetermined region;

a detection section for detecting moving bodies existing in the predetermined region based on a region image obtained by the image pickup by said region image pickup section;

a moving body image pickup control section for controlling a moving body image pickup section which picks up images of the moving bodies detected by said detection section, to pick up images of the moving bodies;

a designation section for designating one of the moving bodies detected by said detection section; and a setting section for setting an image pickup mode to a cyclic image pickup mode in which images of the moving bodies detected by said detection section are successively picked up or a continuous tracking mode in which the moving body designated by said designation section is tracked to pick up an image of the moving body; wherein said setting section setting the image pickup mode to the continuous tracking mode when one of the moving bodies is designated by said designation section.

* * * * *